United States Patent [19]
Moriya et al.

[11] Patent Number: 6,046,745
[45] Date of Patent: Apr. 4, 2000

[54] THREE-DIMENSIONAL MODEL MAKING DEVICE AND ITS METHOD

[75] Inventors: Toshio Moriya, Tokyo; Haruo Takeda, Kawasaki; Makoto Kato, Sagamihara; Fumiko Shiojiri, Kawasaki, all of Japan

[73] Assignee: Hitachi, Ltd., Tokyo, Japan

[21] Appl. No.: 08/820,632

[22] Filed: Mar. 19, 1997

[30] Foreign Application Priority Data

Mar. 25, 1996 [JP] Japan .................................. 8-067785

[51] Int. Cl.$^7$ .................................................. G06F 15/00
[52] U.S. Cl. .......................... 345/420; 382/100; 382/106; 382/286
[58] Field of Search .................................. 345/425, 423, 345/420, 419; 382/100, 106, 286

[56] References Cited

U.S. PATENT DOCUMENTS 4,970,666  11/1990  Welsh et al. ............................ 345/423

FOREIGN PATENT DOCUMENTS 4289976  10/1992  Japan .
5233781  9/1993  Japan .
5342310  12/1993  Japan .

*Primary Examiner*—Mark K. Zimmerman
*Assistant Examiner*—Chante' Harrison
*Attorney, Agent, or Firm*—Antonelli, Terry, Stout & Kraus, LLP

[57] ABSTRACT

Disclosed is an image processing arrangement to determine camera parameters and make a three-dimensional shaped model of an object from a single frame picture image in an easy manner in an interactive mode. There are provided arrangements for designating perspective directional lines and at least two directional lines which are orthogonal to one of the directional lines. There are further provided arrangements for inputting feature information from an actual image in an interactive mode, for inputting a knowledge information concerning the feature information, for calculating camera parameters of the actual image from the aforesaid information, and for making a three-dimensional CG model data in reference to the camera parameters, the feature information of an image and a knowledge information concerning the aforesaid information. With such arrangements, it is possible to make a three-dimensional model easily from one actual image having unknown camera parameters while visually confirming a result.

20 Claims, 30 Drawing Sheets

FIG.23

| lost-Point Position | | 2301 |
|---|---|---|
| ID | DATA | 2320 |
| V001 | (32. 5, 33. 6 ) - (40. 0, 45. 0 ) | 2321 |
| V002 | (33. 8, 30. 3 ) - (30. 5, 31. 0 ) | 2322 |
| V003 | (38. 2, 35. 6 ) - (400. 0, 500. 0 ) | 2323 |
| Right-Angle Crossing Directions | | 2324 |
| ID | DATA | 2325 |
| VN001 | (10. 8, -1. 5 ) - (-20. 0, 60. 8 ) | 2326 |
| VN002 | (100. 3, -3. 1 ) - (-41. 0, 50. 8 ) | 2327 |
| View Point Parameters | | 2328 |
| View Point Position | (3. 14, 15. 9, 72. 6 ) | 2329 |
| Direction | $\begin{pmatrix} 0.87 & -0.19 & 0.24 \\ 0.09 & 0.95 & 0.12 \\ -0.29 & -0.0 & 0.87 \end{pmatrix}$ | 2330 |
| Focal Point Distance | 52.3 | 2334 |
| Three-Dimensional Model Data | | | 2331 |
| Type | ID | DATA | 2332 |
| . | . | . | 2333 |
| . | . | . | |
| . | . | . | |

FIG.43

STEP 4300: START

STEP 4301: DISPLAY SINGLE FRAME PICTURE IMAGE OVERLAID WITH WORLD COORDINATE AXES AND WORLD COORDINATE ORIGIN

STEP 4302: USER DEFINITION OF CHARACTERISTIC POINTS ON SINGLE FRAME PICTURE IMAGE AND INPUT OF RELATED INFORMATION

STEP 4303: CALCULATION OF WIRE-FRAME PORTION AND OVERLAY ON SINGLE PICTURE FRAME IMAGE

STEP 4304: USER DETERMINATION-IS CALCULATED AND DISPLAYED WIRE-FRAME PORTION CORRECT?

STEP 4305: HAS USER FINISHED DEFINING CHARACTERISTIC POINTS?

STEP 4306: STORE EXTRACTED 3-D IMAGE DATA

STEP 4307: END

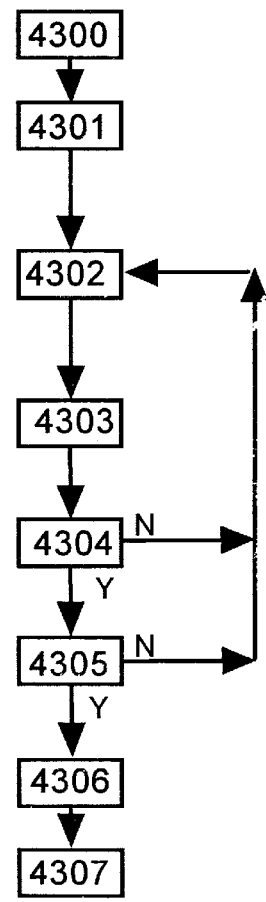

THREE-DIMENSIONAL MODEL MAKING DEVICE AND ITS METHOD

BACKGROUND OF THE INVENTION

1. Field of the Invention

This invention relates to a technology for making a three-dimensional shape model (i.e., computer graphics model) with a computer and the like, and more particularly a three-dimensional model making device and method for making a three-dimensional shape model of an object to be seen as a synthetic image combined with an acutal image, i.e., relates to a special effects model making device and method for utilizing information from a single frame picture image and for generating and superimposing a three-dimensional shape model over actual images.

2. Description of Related Art

As a method for making a three-dimensional shape model of a three-dimensional object with a computer and the like, there is provided a method in which a user uses a graphical user interface (GUI) and the like to input either a shape of the object or its coordinates in an interactive mode. As methods for inputting a shape or coordinates, there can be provided a method in which a three-plane figure is applied, a method in which a figure most suitable for an object to be made is selected from a group of basic figures called primitives which are properly modified to make a model, and a method in which lengths or coordinates are directly inputted using numerical values and the like. For example, the gazette of Japanese Patent Laid-Open No. Hei 5-342310 with a title of "Three-Dimensional Converting Device For Line Element Data And Its Method" discloses a device capable of drawing a sketch on a paper sheet when a three-dimensional object is inputted.

Various situations or cases may exist in model making, i.e., as conditions for making a model of an object, there may be provided: (1) a case in which a shape of the object is already known or can be measured; (2) a case in which a shape of the object is not yet known or defined and a model is made while determining either a practical shape or a practical size; and, (3) a case in which a shape of the object is not known, but its actual image is present. Accordingly, one may apply a method of making a model of an object of which a shape is not known while referring to its actual image, and to make such model in such a way that the model may approach a shape of the actual image as near as possible. However, since this method is merely applied at most to a system in which the actual image is applied only for a reference to make the model of the object, two-dimensional information concerning the shape of the object of the actual image is not reflected directly in the making of the model.

Gazette of Japanese Patent Laid-Open No. Hei 5-233781 with a title of "Cubic Model Making System With Animation Image" provides a method in which a cubic model is made while referring to an actual image, i.e., wherein an object within the actual image and a generated image of the cubic model are overlapped and displayed on a same screen. Within such case, a user can easily confirm a difference between the actual imaged object and a generated image of the cubic model. However, also in this case, the actual image is merely used in confirmation of the produced model and it does not refer to the utilization of information when the model is made. In addition, it is necessary that camera parameters of the actual image required for overlapping the actual image on the produced model be already known.

It is generally impossible to perform a direct making of a three-dimensional model from a two-dimensional information of an actual image. More particularly, since a depth information of an optional displayed point cannot be seen from two-dimensional image information, it is not possible to specify uniformly in what position is the depth information placed in view of its three-dimensional state. However, actually, it is possible to attain a specified position if various assumption conditions are specified and this process is called cubic acknowledgement.

Cubic acknowledgement can be roughly classified into two processes. One process is a method in which a plurality of images seen from different points of view are used, and the other process is a method in which information other than the two-dimensional coordinates contained in the image is utilized from only one image to recover the three-dimensional structure.

One method using a plurality of images is a cubic acknowledgement method with a stereo image. The same object is taken with two or more cameras installed at different locations, and its three-dimensional coordinates values are calculated in reference to information of relative positional relation of each of the cameras and two-dimensional coordinates values on each of the images of the point seen on the image.

Several methods for acknowledging a cubic with one image are as follows, i.e., (1) a method for referencing a point where the three-dimensional coordinates values are already known; (2) a method for comparing an image with a model of a basic shape prepared in advance; and, (3) a method of using texture information of an image and the like.

More particularly, discussing the above method (1) in greater detail, if there are more than three points having already-known three-dimensional coordinates values, it is possible to obtain three-dimensional coordinates with a camera eye and a direction of a sight line. This problem is called in general as PnP (Perspective-n-Point Problem) (Kohichiro Deguchi: "Image and Space", Syokohdoh Publishing, 1991). However, this method is merely operated to calculate data of each of cameras at the most and cannot obtain three-dimensional coordinates of other points contained in the image.

Discussing the above method (2), the method of comparing the object seen on the image with the model of basic shape prepared in advance is carried out such that three-dimensional models of various kinds of basic shapes are prepared in advance, the images seen through a perspective conversion are compared with the actual images so as to estimate and approximate the three-dimensional model.

As a system in which the present method is applied to the three-dimensional model formation, there is a gazette of Japanese Patent Laid-Open No. Hei 4-289976 with a title of "Method For Making A Three-Dimensional Shape Model And Its System". Such provides a method in which a two-dimensional figure information of a three-dimensional object to be processed is inputted, a three-dimensional basic shape model of which a basic shape is approximate to that of the object is inputted, and their control points are corresponded to each other so as to convert the basic shape model and further to make a three-dimensional model.

Discussing the above method (3), as a typical method using the texture information of an image, there is provided a Shape From Texture Process. An orientation of a plane of a surface of the object is calculated in reference to a rich or a lean texture concentration in the surface of the object. There is a disadvantage that an accuracy in calculation may depend upon the kind of texture at the surface of the object or the like.

In the method in which a three-dimensional model is made without applying any direct use of actual image and the formed model is displayed while being overlapped on the actual image so as to confirm the formed model when the three-dimension the object seen on the actual image is formed, the shape information of the object contained in the actual image is not effectively utilized when the model is made. Due to this fact, in a case where the model corresponding to the object of the actual image is made when the three-dimensional model is formed, it is necessary to repeat a modelling and its confirmation numerous times on a trial-and-error basis.

In the method in which the three-dimensional basic shape model is inputted and the model is deformed in such a way that the object of the actual image and its model may be coincided to each other in two-dimensional images, it is necessary that parameters such as a position and an orientation of the camera taking that image or the like be already known, and further, it is necessary that control points of the basic shape model and the object on the actual image are corresponded to each other.

In the method using a plurality of images (stereo-scope), it is necessary to prepare a plurality of images in which the same object is taken from different directions.

While the above-described methods provide some advantages and virtues regarding three-dimensional modelling, there still exists a need for an improved three-dimensional modelling method.

SUMMARY OF THE INVENTION

This invention is directed toward satisfying the aforementioned needs with respect to three-dimensional modelling in general, and in particular relates to a special effects model making device and method for utilizing information from an actual image and for generating and superimposing a three-dimensional shape model over actual images.

Accordingly, an object of the present invention is to provide a three-dimensional model making device and its method in which when a three-dimensional model for a certain object is to be made, the actual image of the object is effectively utilized and the model is made by a simple method as much as possible.

Another object of the preferred embodiment of the present invention is to provide a simplified method/arrangement for both obtaining a three-dimensional structure of an object seen in an actual image, and obtaining camera parameters which were applied when the image was taken.

Yet a further object of the preferred embodiment of the present invention is to provide a simplified method/arrangement for determining camera parameters from a single frame picture image.

In order to solve the above-mentioned problem and provide the above-mentioned object(s), the present invention is comprised of means in which a user inputs a feature information concerning an actual image such as a position of the feature point on the image in an interactive mode from the actual image data when the actual image appearing as the three-dimensional object is present;

means for inputting a knowledge information about the feature information;

means for calculating camera parameters from aforesaid information when said actual image is taken;

means in which a user inputs in an interactive mode the feature information such as a feature point position of the three-dimensional object appeared in the actual image from said actual image;

means for inputting knowledge information such as a three-dimensional restricting condition or the like concerning the feature point; and means for calculating three-dimensional coordinates of the feature point in reference to these inputted data and said camera parameters so as to make finally the three-dimensional model of said three-dimensional object.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments at the time the patent application was filed in order to teach one skilled in the art to make and use the invention, it should be clearly understood that the same is by way of illustration and example only and is not to be taken by way of limitation, the spirit and scope of the present invention being limited only by the terms of the appended claims.

BRIEF DESCRIPTION OF THE DRAWING(S)

The following represents brief descriptions of the drawings, wherein:

FIG. 23 is a view showing an exemplary three-dimensional data table of the present invention;

FIG. 43 illustrates flowchart steps conducted to extract 3-D image data of objects from a single frame picture image.

DETAILED DESCRIPTION OF THE PREFERRED EMBODIMENT(S) OF THE INVENTION

Figure 1:
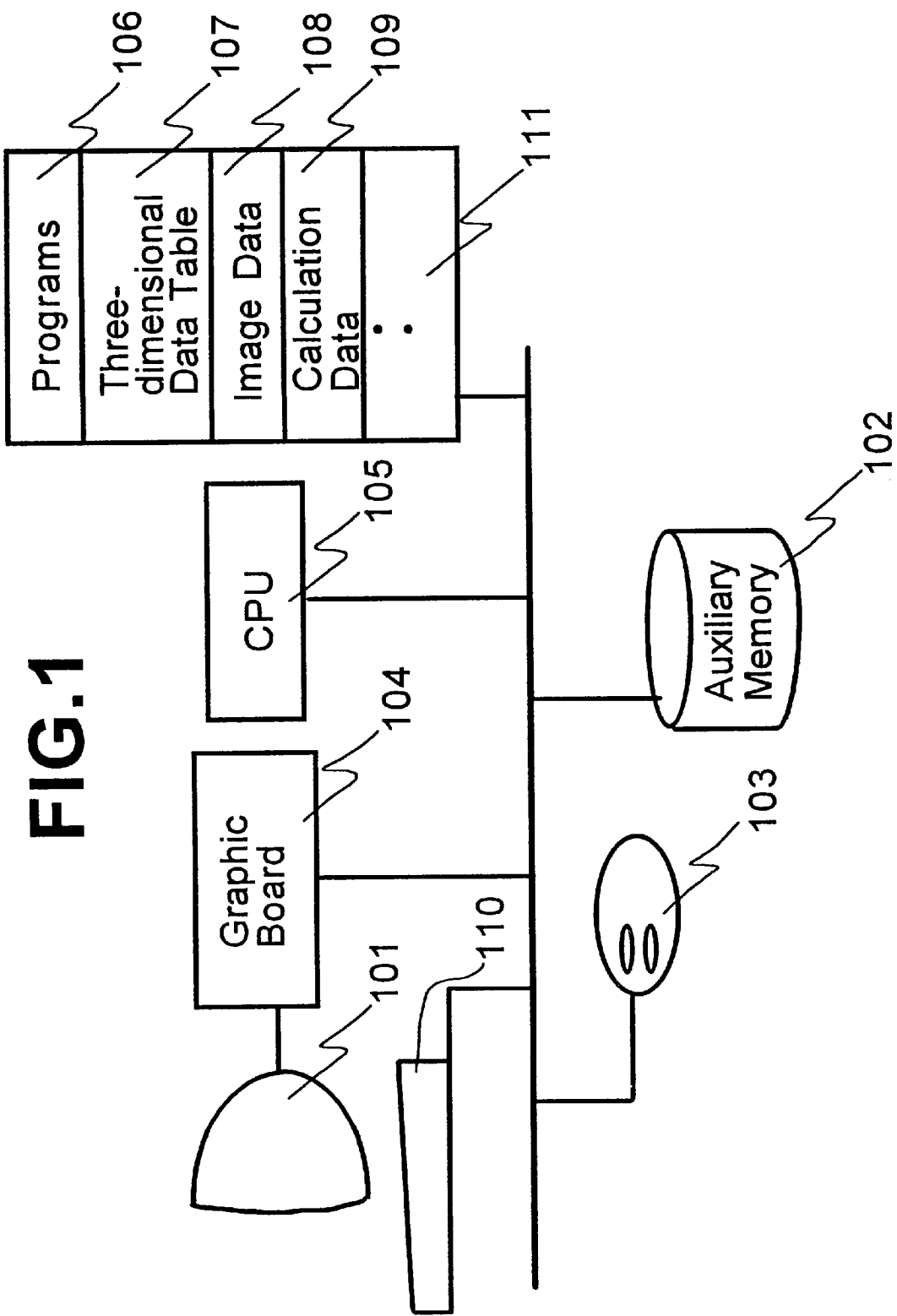
FIG. 1 is a view showing an exemplary hardware configuration of the present invention.

Before beginning a detailed description of the subject invention, mention of the following is in order. More particularly, when appropriate, like reference numerals and characters are used to designate identical, corresponding or similar components in differing figure drawings.

Turning now to a detailed description of a preferred embodiment of the invention, FIG. 1 shows a configuration of a preferred embodiment of the present invention. More particularly, shown are: a key-board 110 for use in inputting numerical values or commands; a mouse 103 for use in inputting two-dimensional coordinates values or operating (i.e., selecting) a graphical user interface (GUI; e.g., icon); a display 101 for displaying an actual image, three-dimensional model and/or a GUI; an auxiliary memory device 102 such as a hard disk or the like to store actual image data, model data and/or programs and the like; a main memory 111 for storing image data, model data, a result of calculation and/or programs or the like during operation; a CPU 105 for performing calculations and/or control based on the programs; and a graphic board 104 for controlling a display of an actual image and/or three-dimensional model on the display 101.

Within the main memory 111, there are stored: programs 106 defining an operation of the present device; a three-dimensional data table 107 for storing three-dimensional structure data of a generated model and/or camera parameter data of the actual image; an image data 108 with the actual image and/or object being changed into digital data; and calculation data 109 for storing a result of calculation and/or parameters during an operation of the present invention.

The graphic board 104 provides a three-dimensional processing function. More particularly, the graphic board 104 automatically displays appropriate visual information on the display, e.g., displays a shape of the model under graphical conditions so as to display a three-dimensional structure of a displaying model, projecting conditions when the model is displayed in a perspective projection, a parallel projection and the like, and there can also be displayed some camera parameters concerning a camera position, an imaging direction, a focal point distance and the like when such conditions are specified. While in a preferred embodiment, the graphic board function is carried out with a hardware graphic board arrangement, such function may alternatively be carried out by a wholly software arrangement and/or a combination hardware/software arrangement. A board providing the above-described functions is generally known in the computer field as corresponding to a three-dimensional graphics board.

An object of the preferred embodiment of the present invention is to devise a device/apparatus providing a simplified method/arrangement for both obtaining a three-dimensional structure of an object seen in an actual image, and obtaining camera parameters which were applied when the image was taken. As one example of a situation wherein there can be utilized a three-dimensional structure obtained in reference to the preferred embodiment of the present invention, if there is an actual image taken by a camera as showing an inner or exterior area of a certain house, once a three-dimensional model of the house can be defined with respect to the actual image, a virtual character (i.e., computer generation (CG) model) can be made to freely walk around in the image. As another example, it would also be possible to place a static virtual object onto the actual image, e.g., place a virtual desk made by a CG at an optional location in the image so as to realize a synthetic display thereof on a screen.

In such applications as mentioned above, there exist the problems of being able to define: (1) an overlapping (i.e., forward or a rearward) relation between an object in the actual image and the CG model; (2) a coincidence between relative passes between the actual image and the CG model; and, (3) an imaging of shading with respect to the CG model. More particularly, in order to make a synthetic formation of the CG model to appear in and interact with the actual image without any irregular feeling, it is necessary that the three-dimensional structure of the actual image become known. Discussion now turns to a three-dimensional structure of an actual image, including discussion of some camera parameters such as a camera position and a direction when the actual image is taken, and a three-dimensional structure information of an object seen in the image.

Figure 2:
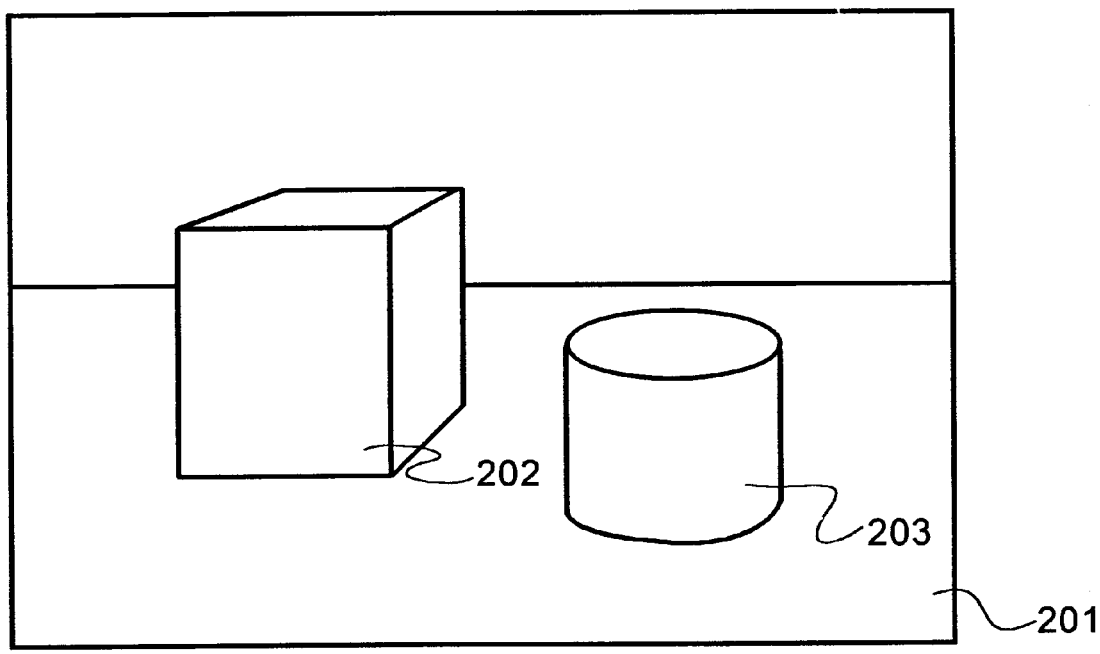
FIG. 2 is a view showing an exemplary actual image relevant to discussion of the present invention.
Figure 3:
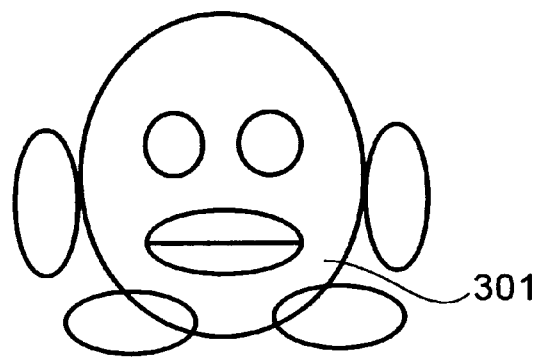
FIG. 3 is a view showing an exemplary computer graphic (CG) model to be synthesized.
Figure 4:
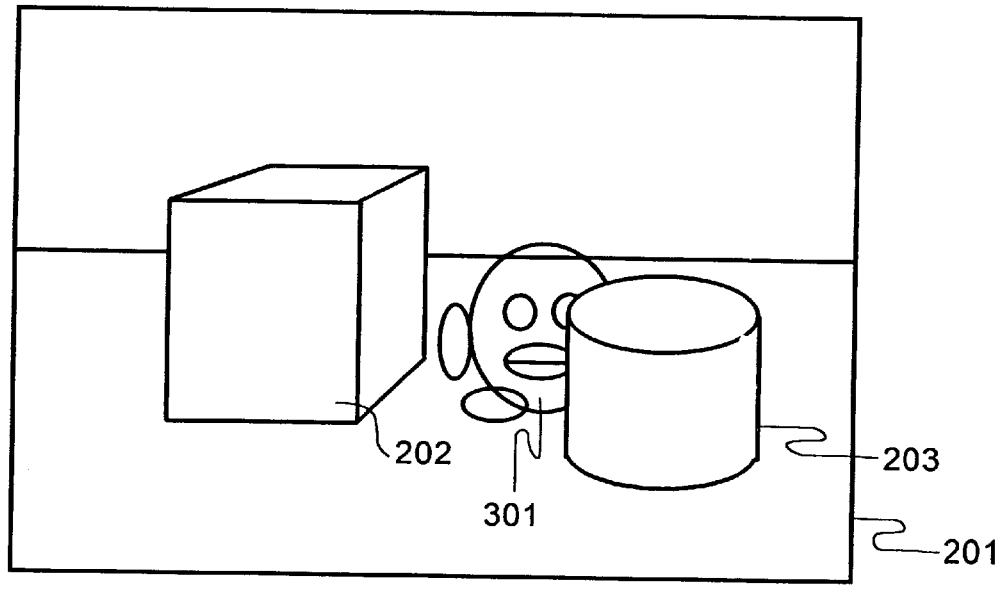
FIG. 4 is a view showing an exemplary image in which a CG model is synthesized and superimposed on an actual image.

Referring to FIGS. 2, 3 and 4, an overlapping (i.e., forward or rearward) relation between the object in the actual image and the CG model will be described in detail. More particularly, FIG. 2 shows an actual image 201 used for making a synthetic image, wherein a three-dimensional object A 202 and a three-dimensional object B 203 are seen in the actual image. FIG. 3 shows a CG model 301 to be synthesized in a three-dimensional manner. That is, the CG model 301 is not formed as a planar model, but instead is formed as a cubic model.

FIG. 4 shows a combined synthetic image 201. When the synthetic operation is carried out in such a way that the CG model 301 is placed at a position indicated in the figure, such figure is not natural unless a part of the CG model is hidden by the object 203 of the actual image as shown in the figure. In order to attain such an overlapping effect, processing is required according to the following exemplary steps:

1.) Three-dimensional models of the objects 202, 203 seen on the actual images to be synthesized are made so as to produce an image in which the models and the aforesaid CG models are synthesized in a three-dimensional manner. To synthesize the images in a three-dimensional manner in this case means that a hidden image processing is carried out when a rearward object (placed behind the forward object) is hidden by the forward object as seen from a certain direction. This processing can be performed by the three-dimensional graphic board automatically;

2.) Then, the three-dimensional model of any object seen in the actual image is deleted from the three-dimensional model image; and 3.) The remaining three-dimensional model image is then overlapped on the actual image and such is displayed as a composite image.

With the foregoing exemplary procedure, It is possible to synthesize the CG model partially hidden by an actual object shown in an actual image.

Figure 5:
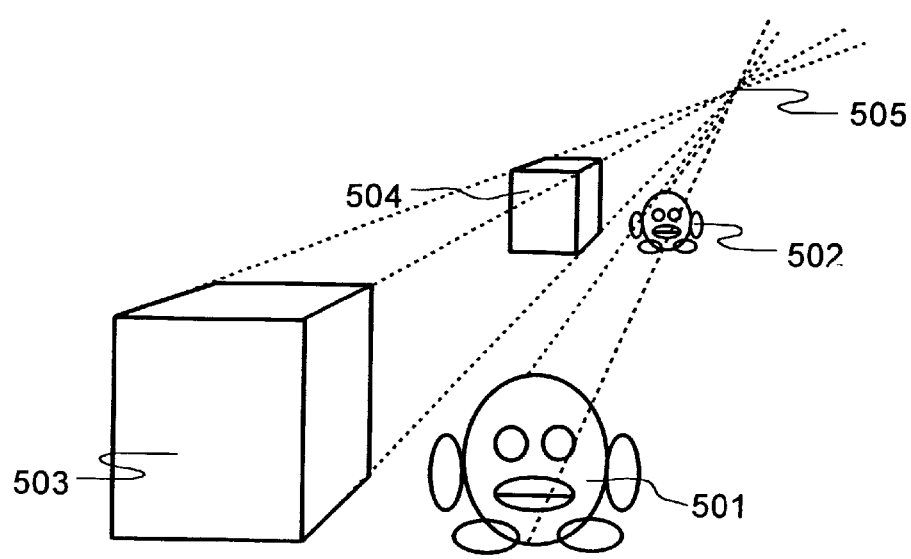
FIG. 5 is a view showing an example to indicate a perspective state of a synthesized image.

Discussion next turns to FIG. 5 and a handling of perspective processing. More particularly, in the case of perspective projection, an object near an operator is seen as a large size object, and in turn, the object far from the operator is seen as a small size object. More particularly, the dotted lines in FIG. 5 represent perspective parallel lines which (in a perspective view) appear to cross at one point on a limitless far point, wherein this point is defined as a vanishing or lost point 505.

It is assumed that the object 503 placed closer to an operator's side and the object 504 placed at the far location are seen as differing sized objects in an actual image of FIG. 5. When the CG model 501 is properly synthesized in relation to the actual image in order to take into account perspective projection, a size of the CG model must be changed in response to the three-dimensional position. More particularly, a nearer CG model 501 is shown as a larger CG model, and a farther away CG model 502 is shown as a smaller CG model. If a distance from the camera position and a relation of how it is decreased in size are not coincided between the actual image and the synthesized CG model, visual discrepancies arise and a believability of the model is remarkably decreased. In order to prevent such an irregular synthesizing from being generated, it is necessary that a camera position, a line of sight direction and a focal point distance for each of the actual image and the synthesized CG image be coincided to each other. Due to this fact, the camera parameters of the actual image become essential information which are important to be known.

Figure 6:
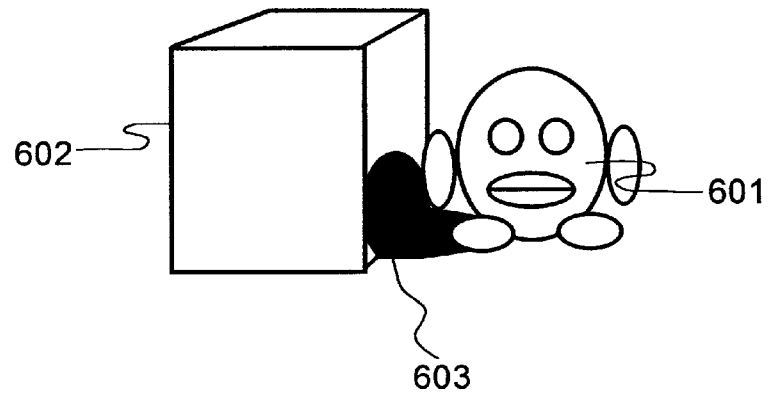
FIG. 6 is a view showing an example in which a shadow is added with respect to the synthesized image.

Referring to FIG. 6, an imaging of a shadow will be described. In order to make a realistic synthetic image, a shadow 603 of a synthesized CG model 601 must be drawn on another actual synthesized image 602. Although a mere reflection of shadow on the ground does not provide any complex image, reflection of a shadow onto a plurality of non-planar objects does require complex imaging. Further, if the three-dimensional shape of the object 602 to be seen is not defined, its shadow shape 603 may not be obtained.

Figure 7:
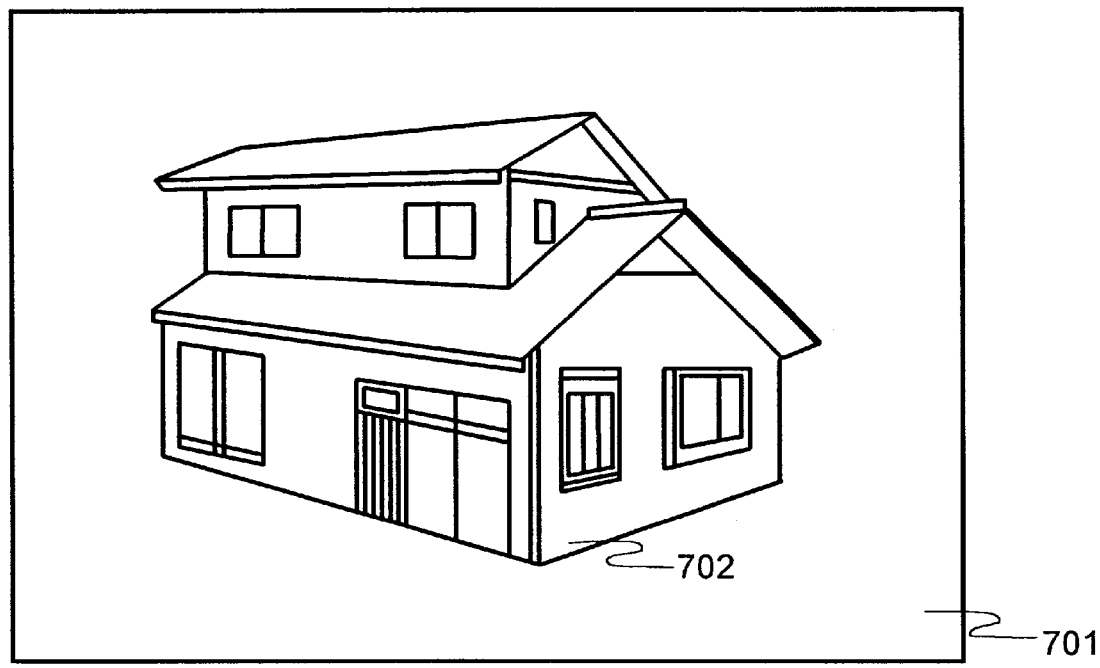
FIG. 7 is a view showing an example of an actual image.

In view of the above reasons, knowledge of the three-dimensional structure of the actual image is essential in order to compose a realistic synthesized image between the actual image and the CG model. More particularly, an exemplary screen image for describing a procedure and method for determining knowledge of a three-dimensional structure will be described with respect to FIG. 7. More specifically, FIG. 7 shows an example of an actual image 701 used in describing a preferred embodiment of the present invention. A certain object 702 (e.g., a house) is seen in the image. In the preferred embodiment of the present invention, there may be applied a data in which an image taken by a camera or a video device is changed into a digital form with either a scanner or an AD converter or the like. It is preferable that a degree of resolution of the image data be as high as possible in view of a problem of error and the like. This data is assumed to be stored in an auxiliary memory device in the preferred embodiment of the present invention.

Figure 8:
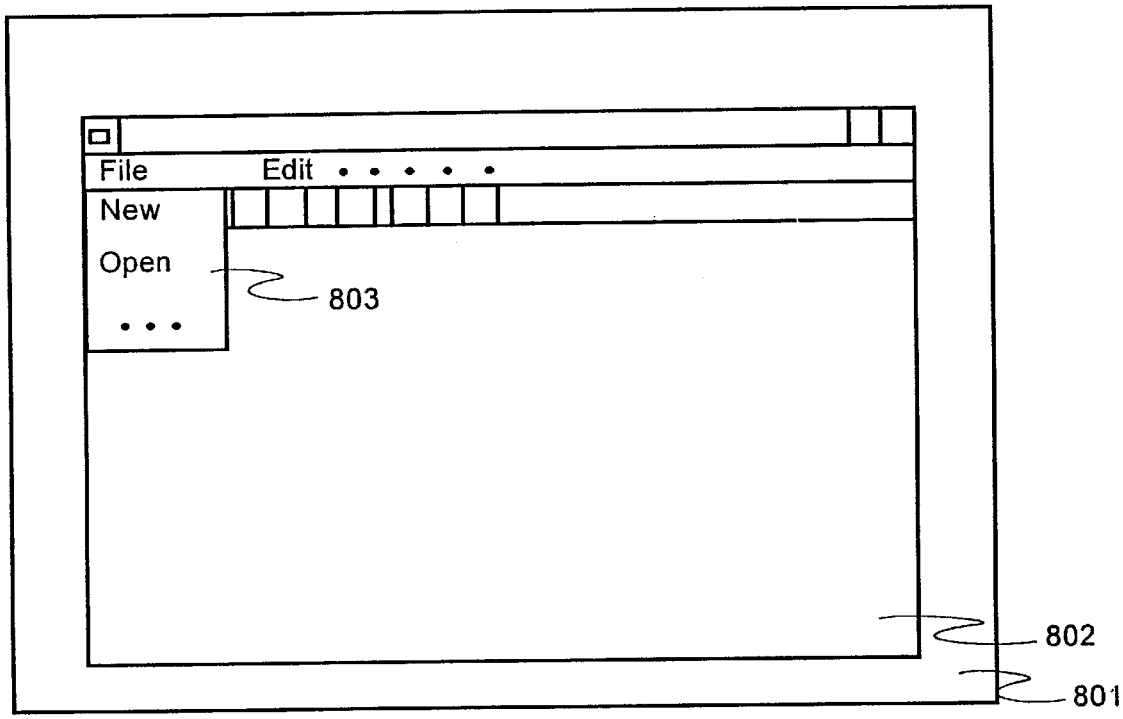
FIG. 8 is a view showing one example of a computer screen layout of a preferred embodiment of the invention.

FIG. 8 shows one example of an initial screen displayed on a display of the present device. On the screen 801 is displayed a window 802 for use in displaying an image or inputting a command. A user may select a command 803 within a pull-down menu "to open a file" and can then specify a file name of the image data which is desired to be processed. Upon completion of this operation, the program in the device reads out the data from the auxiliary memory device, stores it in the main memory and displays it on the screen. Within the main memory, there is provided a three-dimensional data table storing region for the image data.

At first, a user performs an operation to obtain a camera parameter as a view point parameter of the actual image. In the preferred embodiment of the present invention, a method for determining a vanishing or lost point on the image and its crossing direction is applied as one example of a method for obtaining a camera parameter. The lost point is defined as a point in which parallel lines (i.e., lines known to be substantially parallel in a real world object) appear in a perspective projection to converge into one point on the projected plane in a limitless far position (e.g., see FIG. 5).

Figure 9:
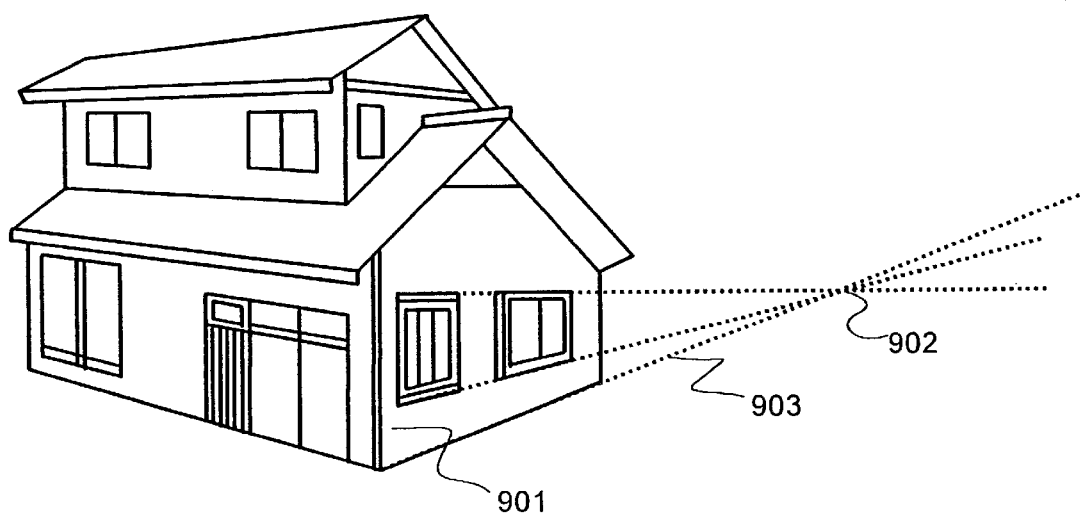
FIG. 9 is a view showing an exemplary view illustrating a lost- or vanishing-point.
Figure 10:
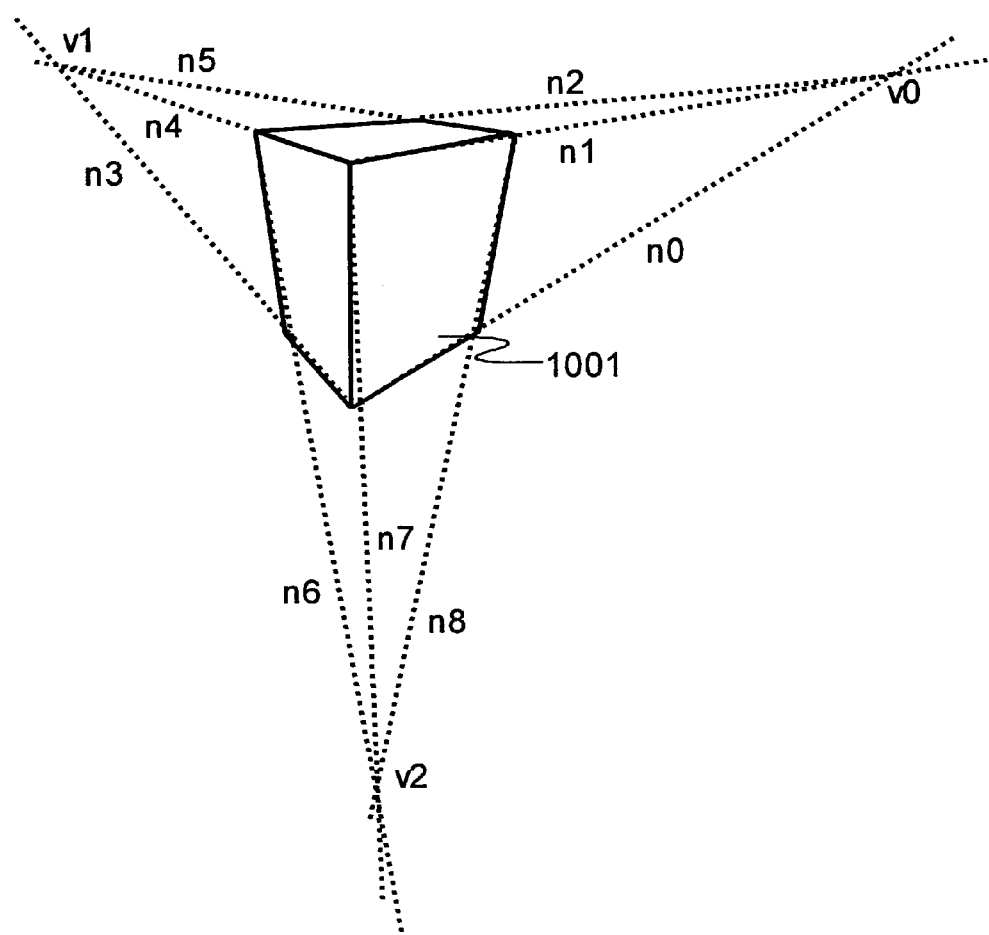
FIG. 10 is a view showing an illustrative example in which vanishing-points of right-angle crossing directions are illustrated together.

FIG. 9 shows a vanishing or lost point 902 in a certain direction 903 with respect to the object 901 illustrated originally in FIG. 7. In order to apply this method, it is necessary to apply a condition in which the lost point and its crossing direction are seen on the image. In most cases, there is usually a number of objects which can be utilized to determine the lost point and its crossing direction. For example, a landscape image showing a building or a linear road or the like may fulfill this condition, and an image of interior room shows an approximate rectangular parallelopiped furniture such as a desk. A user may select a certain lost point from any such image. In fact, a linear line converging into the lost point and two directions crossed at a right angle with respect to the linear line and further crossed at a right angle with each other can be read out of an image. More particularly, as shown in FIG. 10, one rectangular parallelopiped object 1001 is shown as an example. From such image, a number of different combinations of a lost point and perpendicular crossing directions can be determined, e.g., the following combinations:

|    | lost point: | right angle crossing directions: |
|----|-------------|----------------------------------|
| 1  | v0          | n7, n3                           |
| 2  | v0          | n7, n4                           |
| 3  | v0          | n8, n5                           |
| 4  | v0          | n6, n4                           |
| 5  | v0          | n6, n3                           |
| 6  | v1          | n7, n1                           |
| 7  | v1          | n7, n0                           |
| 8  | v1          | n8, n1                           |
| 9  | v1          | n8, n0                           |
| 10 | v1          | n6, n2                           |
| 11 | v2          | n1, n4                           |
| 12 | v2          | n1, n5                           |
| 13 | v2          | n2, n4                           |
| 14 | v2          | n2, n5                           |
| 15 | v2          | n0, n3                           |

In order to practice the present invention, a user may select one of the above combinations, and can initiate selection of a combination by first selecting or defining a vanishing or lost point. As a preferred method for specifying a lost point, a user can view an actual image and define at least two perspective parallel lines on the image, with a crossing point of such defined lines defining a lost point.

As a preferred method for specifying a line, a user specifies two points (e.g., end points) of a possible line on the screen. However, it may be hard to accurately specify points of a line in one operation, i.e., due to limited resolution of a computer screen and/or a user interface for interacting with the screen. Thus, in a preferred embodiment of the present invention, a user interface (e.g., mouse, joystick, touchpad, etc.) is used to roughly specify both ends of a linear line, the linear line is then overlapped on the screen with an auxiliary line (e.g., a dotted line) to allow a visual check of correspondence between the actual linear line and the auxiliary line, and thereafter, control points (e.g., graphical "handles") such as at both ends of the auxiliary line can be captured and dragged (i.e., repositioned) using the user interface, so as to allow the auxiliary line to be more accurately adjusted to the actual linear line. As alternative positioning operations, upon selection of appropriate commands, a user may perform an operation wherein one end point is moved while the other point is being fixed, or may perform an operation wherein both ends are moved in the same direction with respect to each other such that the entire auxiliary line is moved in parallel. In addition, a system can be configured to move the line or the control points not only by the user interface (e.g., mouse), but also through the keyboard by moving the line a distance corresponding to a depressed amount of a key at the keyboard. A display of motion on the screen may be performed on a basis of pixels as a movement unit, or alternatively, on a basis of sub-pixels by applying a technology of anti-areas reflecting line movement. Further, in order to give a visual indication of a degree of line movement, a phantom (e.g., dotted) line can be used to display the original position of the line before movement, while a working (e.g., solid) line can be used to display a present moving position of the line during movement.

Figure 11:
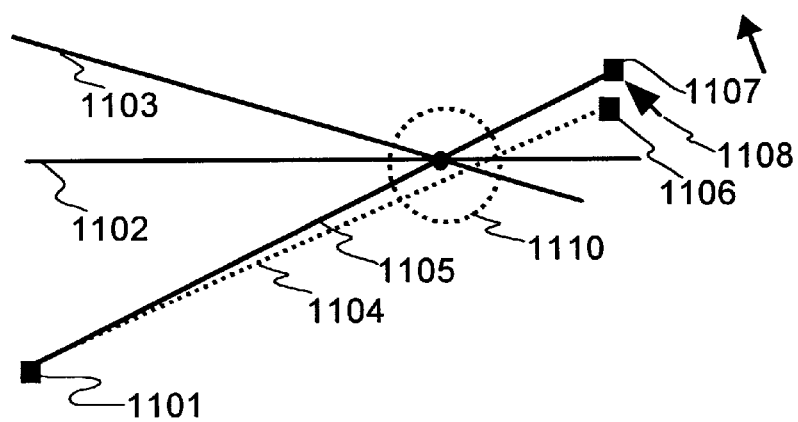
FIG. 11 is a view showing a procedure in which a crossing point of linear lines is obtained.

FIG. 11 shows an example indicating this operation. At first, a user draws lines 1102, 1103 and 1104 on a screen. Upon selection of the line 1104, control points 1101, 1106 are displayed at both ends of the line. When the control point 1106 is captured and dragged with a mouse pointer 1108, such control point 1106 is moved to a new position 1107. Upon completion of the motion, the control points 1101, 1106 are connected with a working line. During such motion, phantom line 1104 remains at an original position of the line to allow visual gaging of a degree of movement. Upon accurate repositioning of the control point 1106, the control point is released (e.g., by releasing a mouse button), whereupon the working line 1105 remains solid to designate the defined line at the defined position, and the phantom line 1104 is erased.

Figure 12:
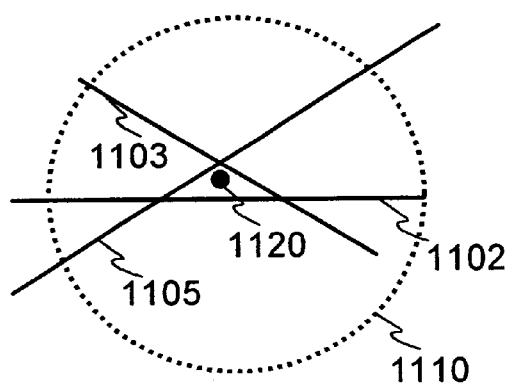
FIG. 12 is an enlarged view showing a procedure for obtaining a crossing point between linear lines.

Once at least two lines have been accurately designated, an intersecting area of such lines can be used to further define a vanishing or lost point. More particularly, As described above, when a suitable command such as "lost point calculation" is inputted after a plurality of linear lines 1102, 1103 and 1105 are specified, the program may calculate a two-dimensional position of a lost point on the image as a crossing point of a plurality of lines. In a case where two or more defined lines cross or intersect at only one definite point, definition of a lost point is easily designated as the intersection point. However, in a case of more than two defined lines, it is sometimes found that the defined lines do not necessarily cross or intersect at one common point, i.e., due to influences such as error or the like. FIG. 12 is a magnified view of the FIG. 11 encircled area 1110, such magnified view illustrating a case where three lines 1102, 1103 and 1105 do not intersect at a common point. In such a case, a crossing point 1120 can be approximately calculated under a certain condition in which a square sum of a distance from each of the lines is made minimum. More particularly, an applicable and practical calculating method is described in detail in "Image Analysis" by Kanaya, Morikita Publishing Co., Ltd. 1990, page 15. Once calculation of the complex lost point is completed, a confirming point 1120 is displayed at a calculated lost point position, whereupon a user can designate acceptance of such position by inputting of an appropriate command (e.g., depressing an appropriate keyboard key, clicking of a mouse button, etc.).

Figure 13:
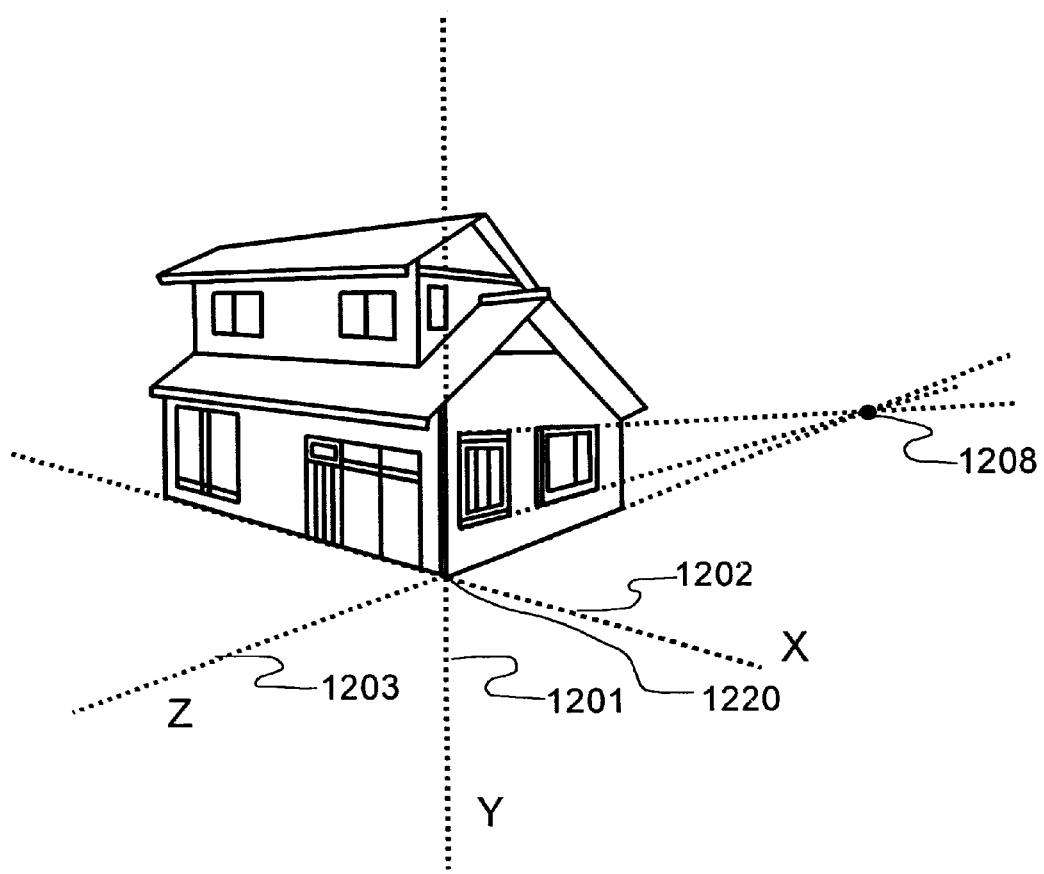
FIG. 13 is a view showing an example illustrating a vanishing-point and right-angle crossing directions in an actual image.

As a next step in the operation of the present invention, a user specifies two additional directions (i.e., lines) which, in a perspective view, are known to cross at right angles with a direction facing toward this lost point, i.e., such actions are directed toward defining a three directional orthogonal system. With regard an appropriate method for specifying such lines, a linear line specifying method described above with respect to definition of the lost point can also be applied. As one example, if appropriate features (e.g., a ground-contacting edge) on a first side of a house in an actual image are first used to define a first direction including a lost point, features (e.g., a ground contacting, edge, roof edge, etc.) on a different side (e.g., front) of the house can be used to define a second orthogonal direction, and further features of the house (e.g., a vertical house corner) can be used to define a third orthogonal direction. The crossing point of the two additional directions can be further used to represent an origin when a three-dimensional state is calculated. Directions of the two lines are defined as an X-axis direction and a Y-axis direction, and a direction connecting a crossing point of such directions with the aforesaid lost point is defined as a Z-axis direction. In the screen, when the two linear lines are specified, the Z-axis direction is displayed as a line (e.g., a dotted line, a differently colored line, etc.) in such a manner that it may easily be understood. FIG. 13 shows an example of a screen after a vanishing or lost point with a lost point direction, and two additional orthogonal directions have been defined. More particularly, a dot 1208 is displayed as the lost point, a line 1202 is displayed as an X-axis direction, a line 1201 is displayed as a Y-axis direction and a line 1203 is displayed as a Z-axis direction. The origin is displayed as a point 1220. In addition to display of such X, Y and Z coordinate lines, in a display of the present invention, labelling such as "X", "Y" and "Z" can also be displayed adjacent such lines.

Figure 14:
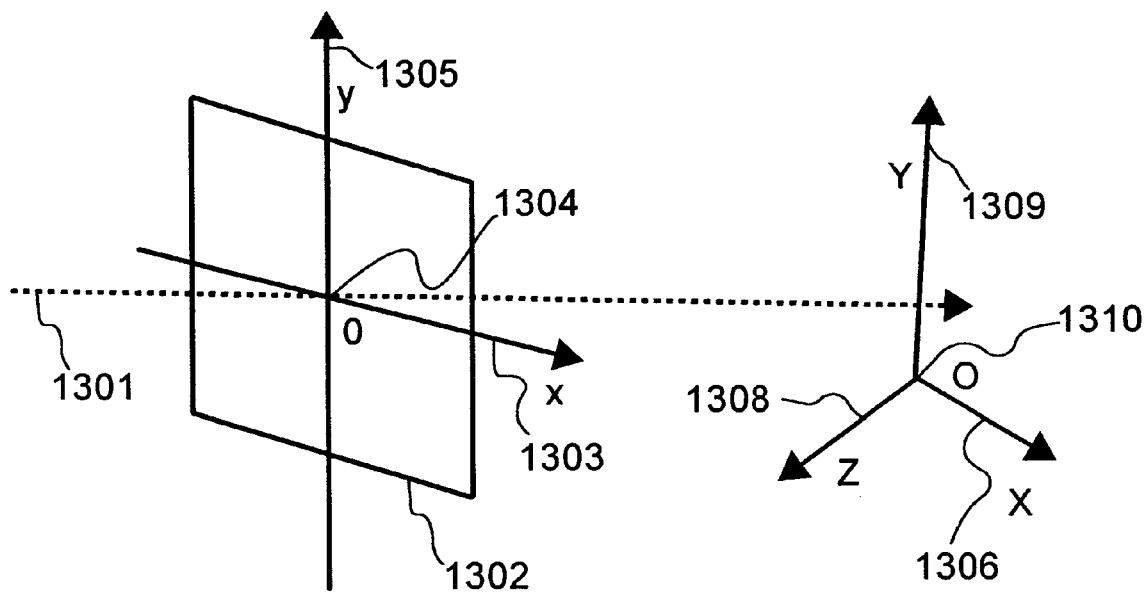
FIG. 14 is a view showing a projection coordinate system related to a world coordinate system.

In addition to the above, it is important to describe two differing coordinate systems used with respect to the present invention, i.e., a world coordinate system and a projection coordinate system. More particularly, FIG. 14 shows a relation of such coordinate systems. In FIG. 14, an auxiliary line 1301 indicates a line of sight direction from a camera position, and 1302 indicates a projected plane (i.e., a viewing window), respectively. A projection coordinate system (left portion of FIG. 14) is applied to specify the coordinates in a plane on the screen of the device of the present invention, which projection coordinate system includes an x-axis 1303 and y-axis 1305, with a center of the projection plane being applied as an origin 1304 of the projection coordinate system. In contrast, a real world coordinate system (right portion of FIG. 14) includes an X-axis 1306, Y-axis 1308 and Z-axis 1309 with an origin O, such axes and origin having no correspondence to the axes or origin of the projection coordinate system (but the world coordinate system and projection coordinate system can easily be interrelated mathematically). More particularly, the line 1202 on the FIG. 13 actual image projection image corresponds to the line 1306 on the FIG. 14 three-dimensional world coordinate system, the FIG. 13 line 1201 corresponds to the FIG. 14 line 1309, the FIG. 13 line 1203 corresponds to the FIG. 14 line 1308, and the FIG. 13 origin point 1220 corresponds to the FIG. 14 origin point O, respectively. Subsequently, when the coordinates are specified on the image in a two-dimensional manner, a projection coordinates system is used, and in turn when a shape of the three-dimensional model or for any actual object or synthesized object or the like are described, a world coordinates system is used. A relation between the projection coordinates system and the world coordinates system is described ahead, such relation requiring determination of various camera parameters when the projection image is taken, i.e. a camera position, a camera direction and a focal point distance in the world coordinates system.

At present, if a lost point position Pv (xv, yv) on the image plane and its right-angle crossing directions vx, vy are inputted, the present invention can use such values to calculate a camera position a, b, c, a direction R and a focal point distance f of this image using a single frame picture image. In this case, the coordinates system is a world coordinates system using the aforesaid X-axis, Y-axis and Z-axis. The direction R is a unit orthogonal array of 3×3. The calculating method will be briefly described.

In general, a position of a certain point projected on an image plane in the projection coordinate system is $$(xn, yn)^T \qquad \text{(Equation 1)}$$

and the three-dimensional position of the actual point in the world coordinate system $$(Xn, Yn, Zn)^T \qquad \text{(Equation 2)}$$

have a relation which is expressed as $$zn(xn/f, yn/f, 1)^T = R\{(Xn, Yn, Zn)^T - (a, b, c)^T\} \qquad \text{(Equation 3)}$$

wherein, $$R = \begin{pmatrix} m0, & m1, & m2 \\ n0, & n1, & n2 \\ w0, & w1, & w2 \end{pmatrix} \qquad \text{(Equation 4)}$$

is defined.

A lost-point position in a Z-axis direction projected on the image plane is defined as $$(xv, yv)^T \qquad \text{(Equation 5)}$$

the origin position in the image plane is defined as $$(x0, y0)T \qquad \text{(Equation 6)}$$

and each of certain points in the X-axis direction and the Y-axis direction in the image plane is defined as $$(x1, y1)^T \qquad \text{(Equation 7)}$$

and $$(x2, y2)^T \qquad \text{(Equation 8)}$$

a condition of a normal orthogonal characteristic of the array R or the like is applied on the basis of $$A = (x0 - x1)(x0 - x2) + (y1 - y0)(y2 - y0) \qquad \text{(Equation 9)}$$

$$\begin{aligned} B = &-yv(x1y0 - x0y1)(x0 - x2) - \\ &yv(x0 - x1)(x2y0 - x0y2) - xv(x1y0 - x0y1)(x2 - y0) - \\ &xv(y1 - y0)(x2y0 - x0y2) + (y1 - y0)yv2(y2 - y0) + \\ &(x0 - x1)xv2(x0 - x2) - (y1 - y0)xvyv(x0 - x2) - \\ &(x0 - x1)xvyv(y2 - y0) \end{aligned} \qquad \text{(Equation 10)}$$

$$\begin{aligned} C = &(x1y0 - x0y1)yv2(x2y0 - x0y2) + \\ &(x1y0 - x0y1)xv2(x2y0 - x0y2) \end{aligned} \qquad \text{(Equation 11)}$$

$$Af^4 + Bf^2 + C = 0 \qquad \text{(Equation 12)}$$

can be accomplished to show a quartic equation for f, thereby the value of f can be obtained. In addition, $$(m2, n2, w2)^T = k(xv, yv, f)^T \qquad \text{(Equation 13)}$$

$$(m0, n0, w0)^T = 1((x1-y0)f, -(x1-x0)f, x1y0-x0y1)^T \times (xv, yv, f)^T \qquad \text{(Eq. 14)}$$

$$(m1, n1, w1)^T = m((y2-y0)f, -(x2-x0)f, x2y0-x0y2)^T \times (xv, yv, f)^T \qquad \text{(Eq. 15)}$$

where, k, l, m are unknown constants, so that a rotation array R is calculated by obtaining unknown constants in such a way that each of them may form a unit orthogonal system.

In addition, as to the camera position a view point position in the camera parameters, $$z0(x0/f, y0/f, 1)^T = -R(a, b, c)^T \qquad \text{(Equation 16)}$$

thereby, it is obtained with a scale factor z0 being left.

A preferred embodiment of the present invention is configured (e.g., via computer hardware and a computer program) to perform the aforesaid calculation, thereby the camera parameters of the image can be obtained. The results of the aforesaid operation are recorded in the aforesaid image three-dimensional data table stored in the main memory. In addition, subsequently, the program delivers the camera parameters to the aforesaid graphic board together with the three-dimensional coordinates values of the model when the three-dimensional model is displayed on this screen, and then the three-dimensional model is always displayed as an image as seen from a perspective (view point) defined by the camera parameters.

Figure 15:
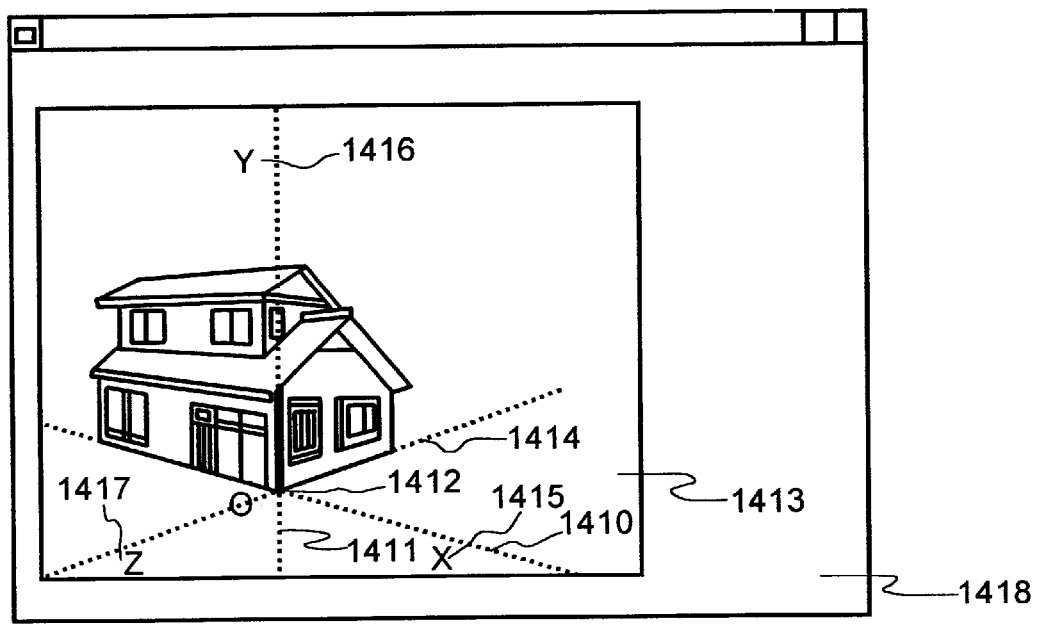
FIG. 15 is a view showing a world coordinate system displayed on an image.

Upon obtaining the three-dimensional camera parameters of the image, the program deletes any working lines on the image displayed in the aforesaid operation, i.e. the line 1203 connecting the origin specified in a two-dimensional manner to the lost point, lines 1201, 1202 indicating two orthogonal directions inputted by a user, and newly displays auxiliary lines as shown in the window 1418 and sub-window 1413 of FIG. 15, i.e., linear line 1410 connecting $(-\infty, 0, 0)$ to $(\infty, 0, 0)$ in the three-dimensional coordinates, a linear line 1411 connecting $(0, -\infty, 0)$ to $(0, \infty, 0)$ and a linear line 1414 connecting $(0, 0, -\infty)$ to $(0, 0, \infty)$. These linear lines coincide exactly or closely to the former three lines 1201, 1202 and 1203 on the image plane.

In addition to these three auxiliary lines, alpha-numeric characters 1415, 1416 and 1417 and 1412 indicating X-, Y- and Z-axes and an origin O, respectively, are displayed in such a manner as a user may easily understand the same.

With the foregoing, a series of operations and procedures for defining and calculating the camera parameters in the device of the preferred embodiment are completed.

Next, operations and procedures for obtaining a three-dimensional structure of an object present in the actual image will be described. A preferred embodiment has two modes of operation in the case that the three-dimensional structure is obtained, i.e., there are provided a mode for setting a restricting condition to be described later and another mode for not setting the restricting condition.

Figure 16:
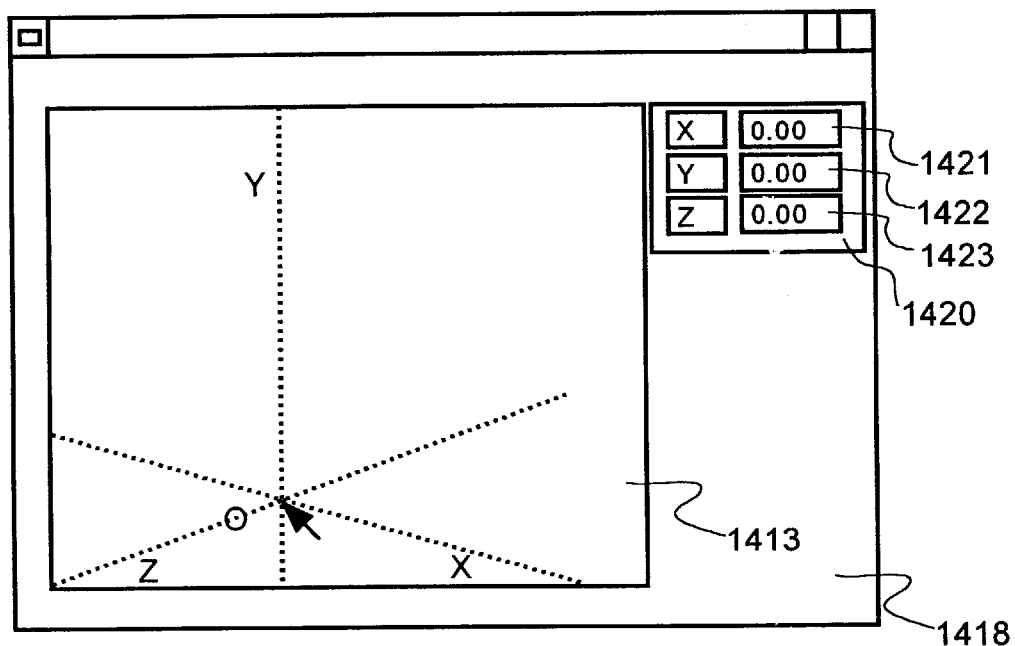
FIG. 16 is a view showing an example of a three-dimensional data box in relation to a computer screen of the present invention.

At first, a method for obtaining a position of a point in the three-dimensional space will be described. As shown in FIG. 16, text areas 1421, 1422 and 1423 for displaying three-dimensional coordinates values are displayed on a screen. The area containing the text areas 1421, 1422 and 1423 represents a three-dimensional coordinate displaying box 1420. In the coordinate displaying box 1420, there are displayed on a real time basis the three-dimensional coordinate values of a point line to be processed as a target at present. It is noted that FIG. 16 illustrates a situation wherein the actual image of the house has been temporarily erased, so as to display only the axes and origin of the defined real world coordinate system. In a preferred embodiment of the present invention, a display of any of the actual image and world coordinate system can be selectively displayed/non-displayed via input of an appropriate command.

Figure 17:
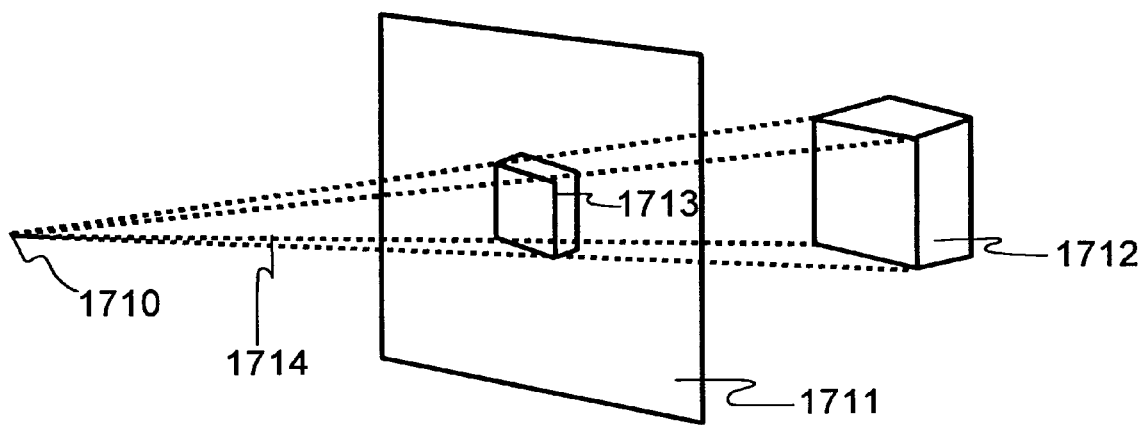
FIG. 17 is a view illustrating a perspective projection.

FIG. 17 illustrates the principle of a perspective projection with respect to a preferred embodiment of the present invention. That is, an image of an object 1712 from a camera position 1710 appears as a smaller image 1713 defined by points where the lines 1714 connecting the camera position 1710 and the object 1712 cross (i.e., intersect) a projection plane 1711. Due to this fact, when one point on the projection plane 1711 is specified, such defined point may represent anything from a point in the world coordinate system to a line in the world coordinate system.

Figure 18:
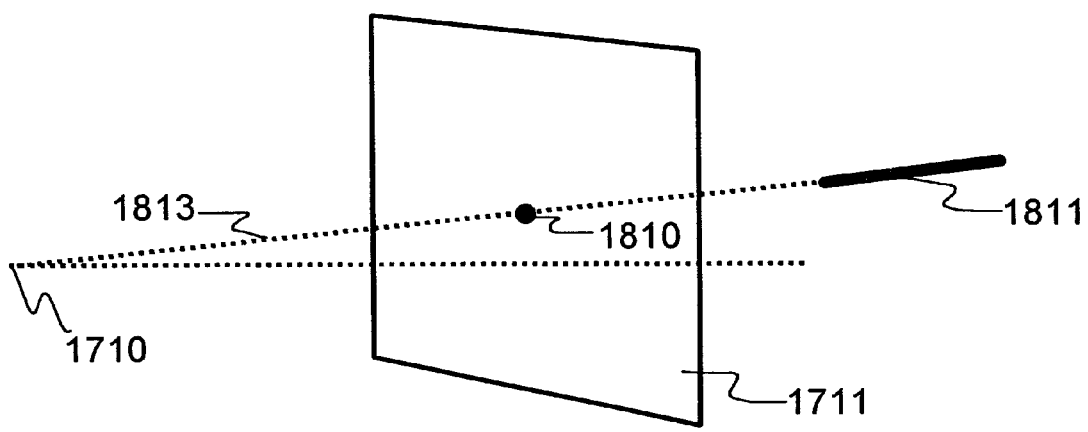
FIG. 18 is a view illustrating another perspective projection.

FIG. 18 shows one example to illustrate such situation. More particularly, in the case where a line 1811 is viewed from an end thereof along a line of sight 1813 from a camera or view point 1710, such line 1811 is seen only as a point 1810 on the projection plane 1711. In other words, it is not apparent from the view point 1710 of whether the point 1810 represents a real world point or line in a three-dimensional space, or what location along the linear line 1811 does the point 1810 on the projection image represent. It is only apparent from the FIG. 18 explanatory view that the point 1810 on the projected image corresponds to the linear line 1811 of the three-dimensional space.

If the camera position, direction and focal point distance are made apparent, this line can be defined uniformly as one point on the projection plane. In the first mode a mode having no such a restricting condition described later, when a user specifies an optional point on the displayed actual image with a mouse, a three-dimensional equation of the linear line projected to the point is displayed in the aforesaid three-dimensional coordinate displaying box. Although there may be applied various kinds of methods expressing the linear line, the linear line in a preferred embodiment is a linear line passing through the camera position, so that the line is displayed in a form of a sum of the camera position and the directional vector. That is, a certain point on the image is defined as $(xn, yn)^T$     (Equation 17)

and the camera position is defined as $(a, b, c)^T$     (Equation 18)

When it is assumed that a sight point direction is displayed by an orthogonal vector of 3×3 and defined as R, and further, a focal point distance is defined as f, the point on the linear line is defined by $(X, Y, Z)^T = R^{-1}\{k(xn/f, yn/f, 1)^T\} + (a, b, c)^T$  (Equation 19)

Thus, if it is assumed that the camera position of (8.24, 9.99, 63.12) is stored in the three-dimensional coordinate display box, it is displayed as $X=[8.24+k(0.26)]$ $Y=[9.99+k(-0.08)]$ $Z=[63.12+k(0.96)]$ where, k is an optional parameter, and (0.26, −0.08, 0.96) indicates a unit vector indicating a direction from the camera position. When the mouse is moved, a value of the directional vector is naturally changed. A user sees this value and can confirm a position of the object on the image according to a numerical value.

Figure 19:
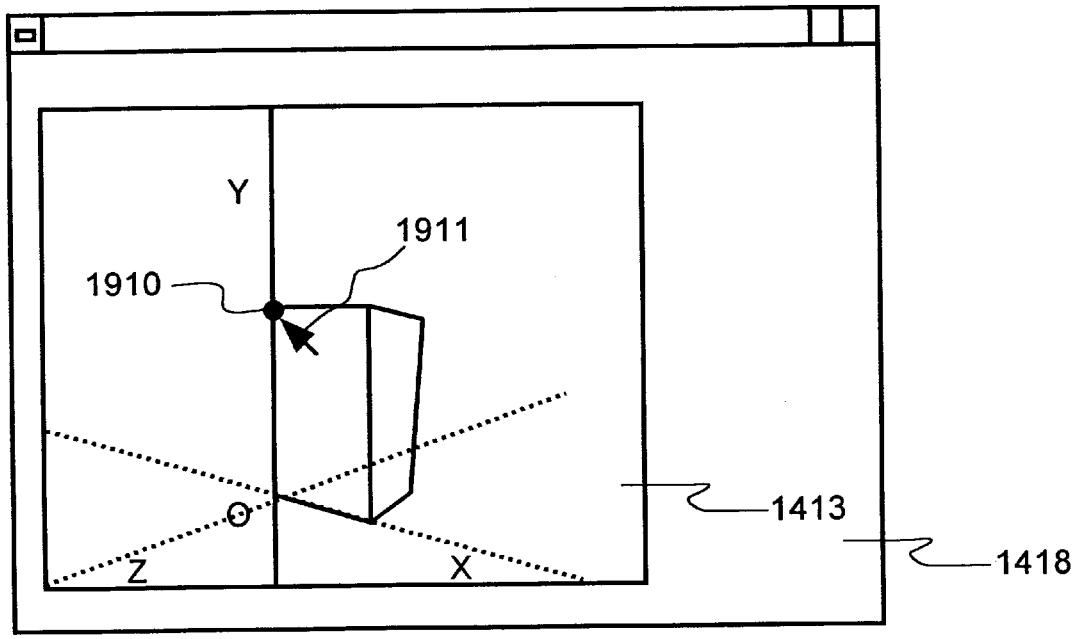
FIG. 19 is a view showing one example of an operating screen of the present invention.

Next, a mode for setting a restricting condition will be described. In reference to FIG. 19, a three-dimensional position of the point 1910 shown in this figure is calculated. This point originally becomes an optional point on the linear line as described above, and in a projection view, whether or not a point represents part of a line may or may not be apparent. In the FIG. 19 example, it can be assumed that the point in this case is a point on the Y-axis in reference to a vertical line feature of the image. In the actual image, a knowledge that each of the sides of the object in the vertical direction is perpendicular to the ground can represent a valid assumption.

Based upon such an assumption, a user may select a mode of instruction by applying a restricting condition in which a point to be inputted is present on a certain line. This operation mode is called as a line restricting input mode. More practically, when the item m in this example is set as a parameter, $$(0, m, 0)^T \quad \text{(Equation 20)}$$

can be expressed as a restricting line. As described above, a certain point on the image plane expressed as $$(xn, yn)^T \quad \text{(Equation 21)}$$

has a point on the three-dimensional space seen at its position which is placed on a linear line expressed like the equation 19, so that in order to obtain a crossing point between the line and the restricting line, both of them are applied to get an equation of $$(0, m, 0)^T = (a, b, c)^T + R^{-1}k(xn/f, yn/f, 1) \quad \text{(Equation 22)}$$

applied to obtain unknown numbers m and k, resulting in that a three-dimensional position of the point to be processed can be obtained. Although the lines in a space may not necessarily have a crossing point, both of them in this case are placed (i.e., restricted) on the same linear line on the projection plane, resulting in that a crossing point is present without fail.

The aforesaid operation will be described in general with reference to an operation performed at the user's side. At first, the user may select a point to obtain a three-dimensional position in reference to the actual image. Concurrently, the user may select the effective restricting line when the point is obtained. As a method for specifying the restricting line, there may be provided the following method.

One of the methods is to specify a linear line already found defined in the three-dimensional space. As described later, the present device enables the point or line or plane of which a three-dimensional shape is already obtained to be displayed on the screen. The user may display these items on the screen and select from them, a line acting as the restricting line. As one applicable selecting method, a clicking or selection of the line with the mouse can be applied. This selected line then becomes the restricting line. In the example shown in FIG. 19, this is a line connecting (0, –∞, 0) to (0, ∞, 0).

Another method is one in which the point in which a three-dimensional state is already set is specified, and a certain direction is specified in reference to the point. At first, a user displays all the points of which three-dimensional shapes are already set in the same manner as that for specifying the aforesaid linear line, and clicks and selects a proper point from them. This point becomes a current point. A user specifies a direction in reference to this current point. As a method for specifying the direction, the direction can also be inputted directly as a vector through numerical values, although there may be applied also a method in which the restricting condition is set for each of the X-axis, Y-axis and Z-axis, respectively. In the method for inputting a direction directly through numerical values, a user may input the three-dimensional coordinate values in the numerical value input area. As the numerical value input area, the FIG. 16 three-dimensional coordinate displaying box 1420, for example, may be applied. A linear line connecting this point to the aforesaid current point becomes a restricting line. A method for setting a restricting condition in an axial direction is based on the following principle. When it is assumed that two component elements of three component elements X, Y and Z are fixed and the remaining one component element is set free, this process indicates a linear line in parallel with a direction of the free component element. For example, assume that the coordinates of a certain point are defined as $$(50.2, 30.6, 33.4)^T \quad \text{(Equation 23)}$$

and appropriate inputting fixes values of

X=50.2

Z=33.4 and if the Y component element is set as a free value, the equation can be expressed as $$(50.2, n, 33.4)^T \quad \text{(Equation 24)}$$

in parameters. That is, it shows a linear line passing through a point $$(50.2, 30.6, 33.4)^T \quad \text{(Equation 25)}$$

and in parallel with the direction of Y-axis.

Figure 20:
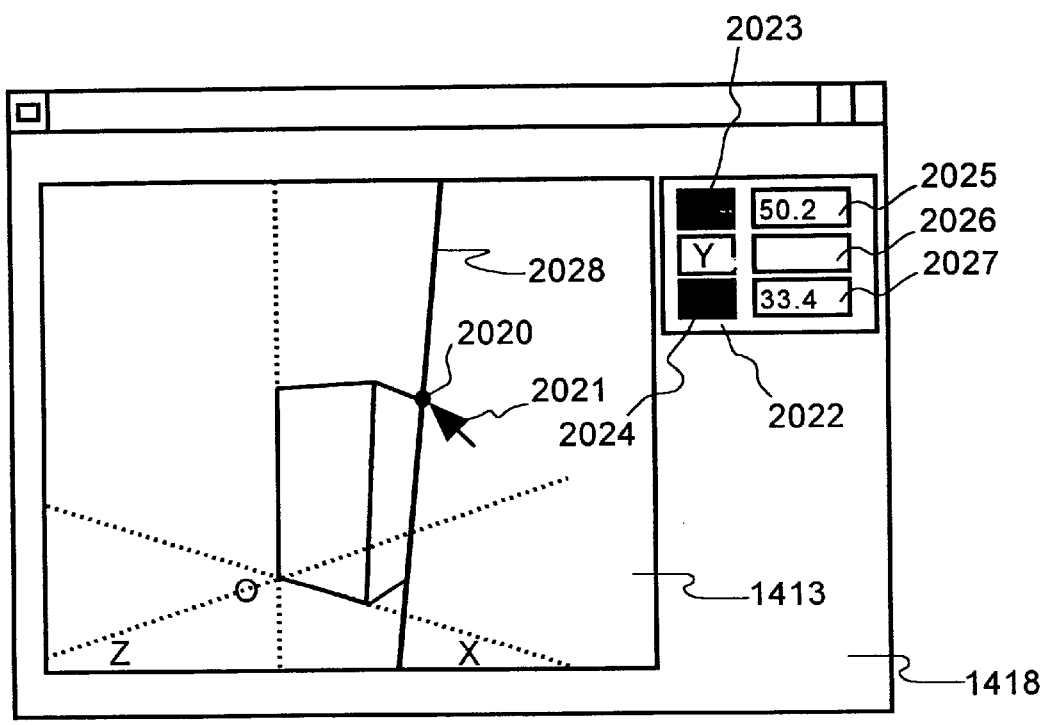
FIG. 20 is a view showing a more detailed example of an operating screen of the present invention.

When a user specifies the current point, the coordinates of the current point are displayed in the three-dimensional coordinate displaying box. A user may select the two restricting component elements with respect to any of the three X-axis, Y-axis and Z-axis component elements, for example, an indication (e.g., highlighting, etc.) indicating restriction is applied to the column of the X-axis and the column of the Z-axis in the three-dimensional coordinate box where the coordinate values of the current point are displayed. This indicates that the X-axis value and the Z-axis value in the three component elements of X, Y and Z expressing the coordinates are fixed to the values above. FIG. 20 indicates the actual screen at this time. It is assumed that there is a certain point 2020 on the actual image of which three-dimensional coordinates are already obtained. When a user specifies this point to set the current point, at first the three-dimensional coordinate values of this point are displayed in each of the areas 2025, 2026 and 2027 in the three-dimensional coordinate values displaying box. Then, a user may input the restricting condition. If it is assumed that it is desired to restrict component elements of X-axis and Z-axis and specify a line of a free Y-axis component element, for example, the user clicks the buttons 2023, 2024 in the box 2022 and sets the buttons in their selected states. The coordinate values at the current point are displayed in the areas 2025 and 2027 as they are. Since the Y value is free and user designatable, no value is displayed in the area 2026. That is, this means a linear line that $$(50.2, n, 33.4)^T \quad \text{(Equation 24)}$$

represents a restriction line. The program displays this linear line on the actual image 1413. The foregoing is an example of operation in which the restricting condition is actually defined.

Figure 21:
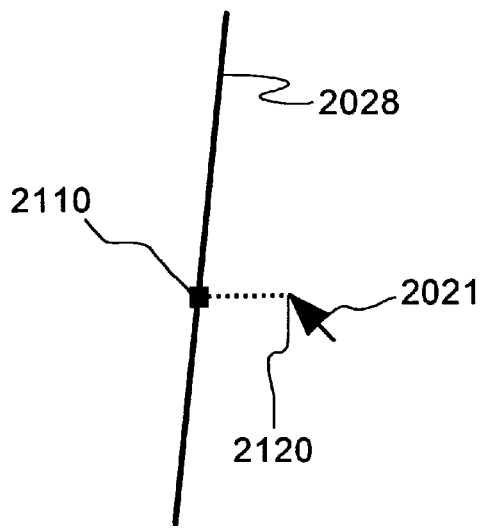
FIG. 21 is a view showing a method for specifying a point.

When the restricting line is determined by any of the aforesaid operations, the program may display this line with a specific color or other type of distinguishing highlighting in such a way that it may easily be apparent to a user. Then, a user may specify a target point placed on this restricting line. At this time, the point where the user may point to with the mouse is restricted to lie on this line. For example, in FIG. 21, when the user clicks the point 2120 in the figure, the present invention's device/program acknowledges a point 2110 on the restricting line 2028 which is most near to the former point as a specified point. The device/program displays a control point dot 2110 indicating that the former point is specified at the indicated point. Since it is not limited that the target point can be specified only through one operation, several operations may be accommodated in order to allow adjustment of a specified point, i.e., a certain point can be first roughly specified to display a control point, and thereafter, a location of the control point can be moved by selecting and dragging with the mouse cursor 2021. Since the position to be moved is still confined to being provided on the restricting line, the point is moved to the point on the restricting line which is most near a position of the mouse cursor.

Figure 22:
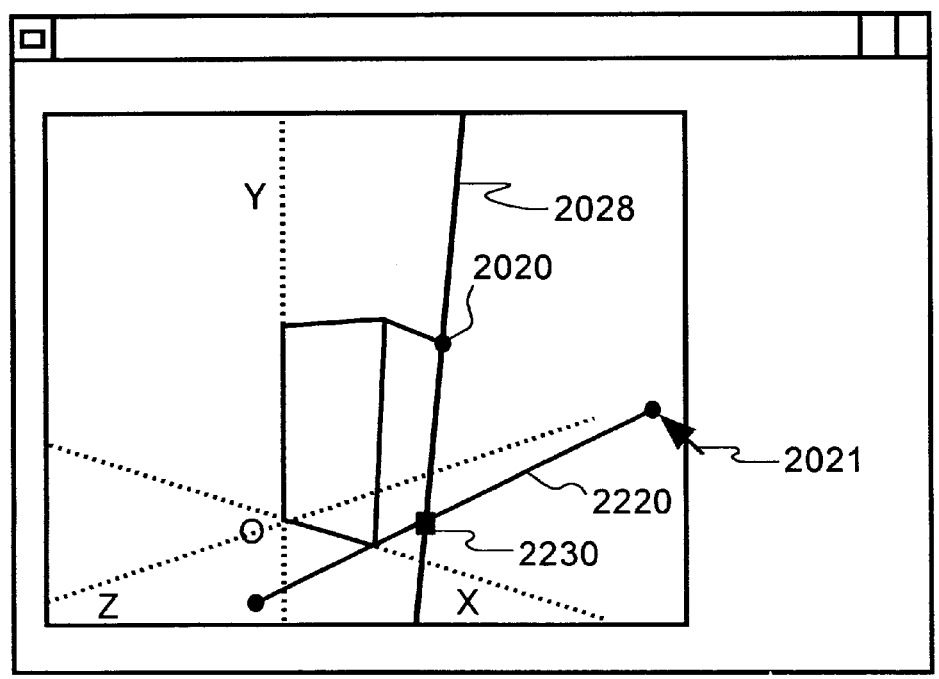
FIG. 22 is a view showing a further example of an operating screen.

In addition to the method of the present invention using a point method to specify a selected point, it is also possible to specify a target point as a crossing point between a certain other point and the restricting line. Selecting this method causes a defining line 2220 to be displayed in the screen as shown in FIG. 22. As described above with regard to the determination of the vanishing or lost point, in the present example, the user moves this defining line under an operation of dragging of control points (i.e., handles) at both ends thereof, and further causes an updating of the target point 2230 to the new position of the crossing point between the adjusted defining line 2220 and the restricting line 2028. Under this condition, when the user inputs a command for instructing a final acceptance of the fine-tuned point, this point is acknowledged as the specifying point by the device/program.

In addition to specifying a point as described above, it is frequently found that an entire top plane of a rectangular parallelopiped object as shown in FIG. 22 can be defined at once, rather than as points, i.e., such plane can be specified as being defined within crossing points between the sides to enable the object to be easily and accurately inputted. A method which will be used by the present device/program to define a desired point, line, plane, etc. (e.g., the method for inputting the specified point as the crossing point of lines, or the method for inputting it as a point) can be freely changed over through input of an appropriate command operation performed by a user.

With the foregoing operation, when the target point on the restricting line is specified by a user and a command for instructing final acceptance of an inputted point is inputted, the device/program may calculate the three-dimensional position thereof in reference to the two-dimensional position of the point on the screen and the equation of the restricting line (e.g., Equation 22). The calculated result is recorded in the three-dimensional data table together with an ID No. for identifying the point and the two-dimensional position of the point on the image. The method for specifying and calculating the position of the point of the three-dimensional plane has been performed as described above.

Next, a three-dimensional table of the present invention will be described. As shown in FIG. 23, such table can include recorded data concerning the camera parameters, and also data about the three-dimensional model. More particularly, with regard to camera parameters 2328, there are a camera position 2329, a line of sight direction 2330 (given as X, Y and Z vectors which can be normalized to determine an actual line of sight direction), and a focal point distance 2334 as described above, and further, information used for obtaining these values is also recorded in this table in addition to the data. Recording of this information enables a subsequent correcting operation to be carried out if needed. In addition, since this information becomes data in the projection coordinate system specified on the actual image, this information becomes the two-dimensional data. Under the preferred embodiment of the present invention, there has been employed a method for calculating the camera parameters using the lost point and crossing directions, and accordingly, appropriate right-angle crossing direction data 2324 is designated after the data header 2325 and includes crossing directions 2326 and 2327 with respect to the lost point position 2301. Since the lost point position 2301 has been specified as a crossing point of a plurality of linear lines, a data header 2320 marks a beginning of linear line data 2321, 2322 and 2323 (in vector form defining three lines defining one vanishing point) which are recorded in the table. The two crossing directions are expressed in forms to connect coordinates at both ends of the linear lines 2326 and 2327.

The data 2301 and 2320–2327 pertain to definition of a world coordinate system (including: a world vanishing point; world X-, Y- and Z-axes; and, world origin O), whereas the data 2328–2330 and 2330 pertain to definition of a projection coordinate system (including a projection camera view point o; a line of sight direction; and, a focal point distance).

The three-dimensional model data 2331 is defined as data in which the object seen on the actual image is changed into a model. Since the model is expressed as a collection of the points or lines and the planes or cubic bodies, it is recorded as a collection of data 2332, 2333 indicating their classifications and of data such as coordinate values or the like for specifying each of the shapes or the positions thereof. For example, if there is provided a point, its three-dimensional coordinate values correspond to this data and if there is provided a line, its three-dimensional coordinate values at both ends or an ID No. already described in this table correspond to this data.

Discussion now turns to a procedure and a method for calculating a linear line on the three-dimensional state in the preferred embodiment of the present invention. More particularly, a first method for making a linear line is a method in which two points in the three-dimensional state already made are coupled to each other. A user issues a command to overlap the point already required for the three-dimensional coordinates on the actual image and display it through an operation of the command. Upon receiving of this instruction, the device/program refers to the three-dimensional data table and delivers both the recorded three-dimensional point data and the camera parameter data to the graphic board. The graphic board displays this point while being overlapped on the actual image.

A user may select any suitable two points from the aforesaid group of displayed points and issue a command to make a line. The device/program may then connect the two points to each other to make a linear line.

A second linear line making method is a method in which a certain restricting condition is applied with the already-made three-dimensional point being set as a reference point and the point is extended in a certain direction. A user issues a command to overlap all the points already required for the three-dimensional coordinates on the actual image through an operation of a command and to display them. Upon displaying of the points through the program, the user may select a suitable one point as a reference point. Then, through selecting of appropriate commands or buttons on a screen, the user instructs which component is restricted, and which component is given a degree of freedom. For example, as the reference point, the user may select (50.0, 60.0, 30.0)

and further as a restricting condition, select a restriction in an X-axis direction, a free state in a Y-axis direction and a restriction in a Z-axis direction, resulting in that as the target line, a restriction line expressed with a parameter of (50.0, k, 30.0)

is displayed. The user cuts this restriction line at a proper starting point and a proper ending point to define a subsection of such restriction line as a defined linear line. The operation performed in this case is similar to that for specifying a restricting line when the aforesaid point is specified.

A third linear line making method is a method in which the line is explicitly made (i.e., drawn) through a mouse operation on the actual image. A user specifies the restricting condition through a button operation on the screen. As an operation for restricting the restricting condition, for example, it can be specified that a linear line to be made is placed on a certain plane. An actual image showing a house is considered. A side of the house contacting with the ground represents an interface between a wall and the ground, and the ground can be specified as representing a coordinate Y=0, wherein the Y-axis represents a vertical direction. To restrict based upon such known situation, the user specifies $$Y=0$$

as its restricting condition. After this operation, the user specifies a two-dimensional coordinate position of a linear line to be attained on the actual image on a projection plane. A specifying method is similar to the method for specifying either the aforesaid lost-point or the linear line in an orthogonal direction. When the linear line on the projection plane is determined and a plane where the line is present is also determined, the linear line on the three-dimensional space is uniformly obtained. This state will be described more practically.

Figure 24:
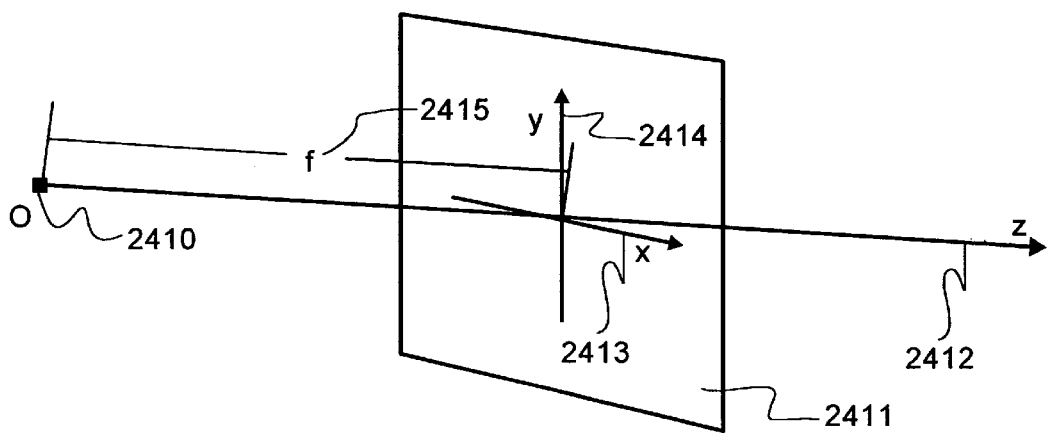
FIG. 24 is a view illustrating a further perspective projection.

More particularly, as shown in FIG. 24, a coordinates system in which a camera position 2410 is set as an origin, a direction 2412 directed from the camera position to a nominal line direction of a projection plane 2411 is set as a Z-direction, each of an x-direction 2413 and a y-direction 2414 on the projected image is set as an X-direction and a Y-direction is defined as a view point coordinate system. In this case, a distance from the view point to the projected plane is a focal point distance f 2415. The world coordinates system and the view point coordinates system can be easily changed over through a parallel movement and a rotational movement.

Figure 25:
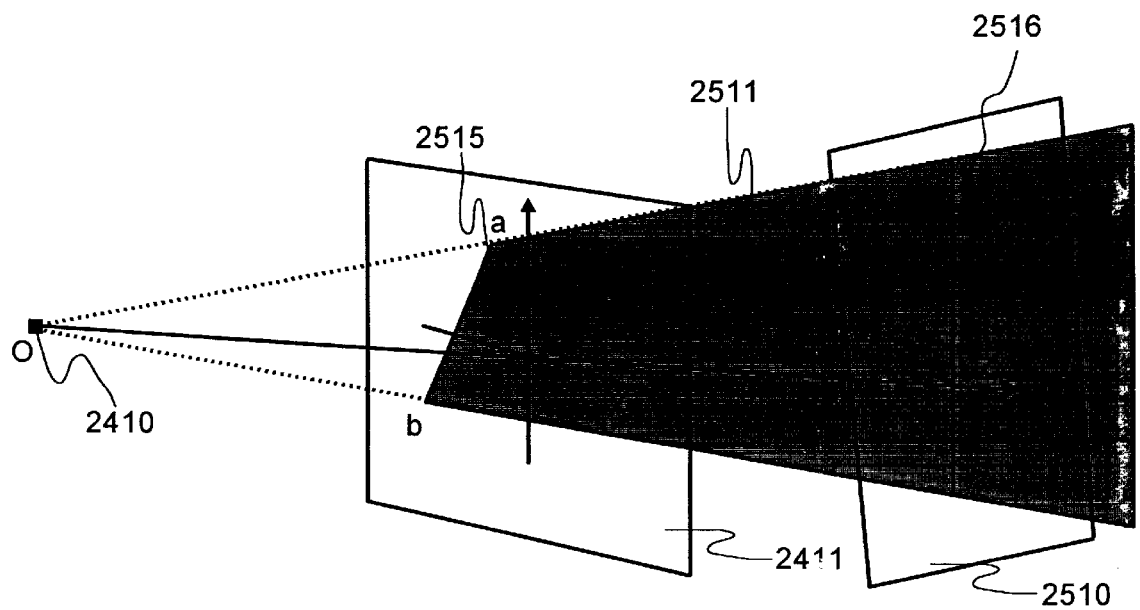
FIG. 25 is a view illustrating the making of a line with the present invention.

At present, as shown in FIG. 25, a linear line on the projected image 2411 is defined as a line ab 2515 and a camera position is set at a camera origin O 2410. Each of coordinates of ab on the projected image is defined as $$a=(xa, ya)^T$$
$$b=(xb, yb)^T \quad \text{(Equation 26)}$$

When it is expressed in a three-dimensional manner in the view point coordinates system, the focal point distance is defined as f, this is expressed as $$a=(xa, ya, f)^T$$
$$b=(xb, yb, f)^T$$
$$O=(0, 0, 0)^T \quad \text{(Equation 27)}$$

The fact that it is projected as a linear line ab on the projected image means that this line plane is present on a plane 2511 connecting three points a, b, c on the three-dimensional space. Thus, the linear line to be attained becomes a portion 2516 in which this plane and a plane 2510 in the world coordinates system are crossed to each other. Since the part where one plane and the other plane are crossed to each other on the three-dimensional space becomes a linear line, such crossing line represents a linear line to be attained.

A fourth linear line making method is a method in which the line is made through a parallel movement of a linear line already made. More particularly, a user issues a command for displaying all the linear lines to be attained for a three-dimensional shape and displays a group of linear lines on the actual image. The user selects a proper linear line through an operation of the mouse or the like, and issues a copy command through a menu button or the like. When the user specifies a proper position and issues a paste command, a new linear line is produced at that position. As the method for specifying the position, there may be applied a method in which one point is selected from the points with their three-dimensional positions being determined and applied as a starting point of the linear line and another method in which a position specified by a user through a mouse is applied as a starting point of the linear line or the like.

The foregoing represent methods for making a linear line. Upon making of the linear line, the device/program of the present invention records it in the three-dimensional data table and displays the produced linear line on the image. Both ends of the linear line are associated with control points, and any necessary correction of a length of the line can be corrected through a selecting and dragging of an appropriate control point.

Next, a method for making an image will be described. More particularly, a first plane making method is a method in which a plane is made as a collection of three-dimensional points or lines already made. A user may issue a command to overlap the already-made points or lines on the actual image and to display them. The displayed actual image allows the user to select the combination of three or more points or the combination of lines and points. If the three points on the three-dimensional system are specified, a plane passing through these three points is uniformly defined, so that a defined plane becomes a target plane. Alternatively, if one point and one linear line are specified, a plane passing through this point and the line is uniformly determined. However, in a case where an additional condition (e.g., point or line) more than that discussed above is specified, there may be present a case in which one of the points or lines is not present in the same plane as all other specified points or lines. In the preferred embodiment, in a case where the device/program detects through calculation that a supplied excess point or line is non-planar, the device/program performs an error display indicating that it is not present in the same plane. A user can then have the option to remove a non-required point or a non-required line from the target points or target lines for its selection, and then issue a command to recalculate and redraw the corresponding plane. In addition, in the case of a device/program which supports a curved plane in addition to the flat plane, there may be applied a method for deforming a proper curved plane model in such a way that the model may pass through a group of selected target points.

Although a plane is made with the foregoing arrangement, its definition of the shape will be described later.

A second plane making method is a method in which already-made three-dimensional points or lines are applied as reference points or reference lines and a certain restricting condition is applied in reference to these points or lines. The reference points or reference lines are selected through an operation of the mouse. A user gives a certain restricting condition, and requests determination and display of a plane passing through the reference points and the reference lines selected under this condition. For example, when the reference points are $$(50.0, 60.0, 30.0)^T \quad \text{(Equation 28)}$$

a plane expressed with parameters in which some restricting conditions of a free state of X-component, a free state of Y-component and a fixed state of Z-component $$(k, 1, 30.0)^T \quad \text{(Equation 29)}$$

becomes a plane to be made. As a method for specifying the restricting condition, it may be required to specify a nominal line vector.

A third plane making method is a method for specifying directly a plane with numerical values. For example, when an equation of the plane is defined as $$aX+bY+cZ+d=0 \quad \text{(Equation 30)}$$

the values of a, b, c, d are inputted through the key-board and the like.

A fourth plane making method is a method in which an already-made plane is moved in a parallel movement or the like. A user displays a group of planes already made through an operation of command. A user may select a proper plane through an operation of a mouse or the like, and inputs a copy command. Then, a user specifies a proper three-dimensional position as a reference point by inputting a numerical value through a key-board, or selects a three-dimensional point already generated. When a command of paste is inputted, the program makes a plane selected by the previous operation and a plane moved in parallel to pass through the reference point as a new plane.

More practically, a nominal vector of the selected plane is calculated to make a plane having the nominal vector so as to produce a plane passing through the reference position. For example, when a reference point position is defined as $$(x1, y1, z1)^T \quad \text{(Equation 31)}$$

and a nominal line vector is defined as $$(nx, ny, nz)^T \quad \text{(Equation 32)}$$

a plane to be defined becomes $$1/nx \cdot (X-x1)+1/ny \cdot (Y-y1)+1/nz \cdot (Z-z1)=0$$

As described above, as a method for making a plane, several methods may be provided. However, the method described in this specification up to now shows that even if a plane is generated, its shape may not be defined and so the plane is one in which it is extended in each of the directions in a limitless manner. In view of this fact, a process for defining a limited (as opposed to infinite) shape of the plane after it is generated will be described.

Figure 26:
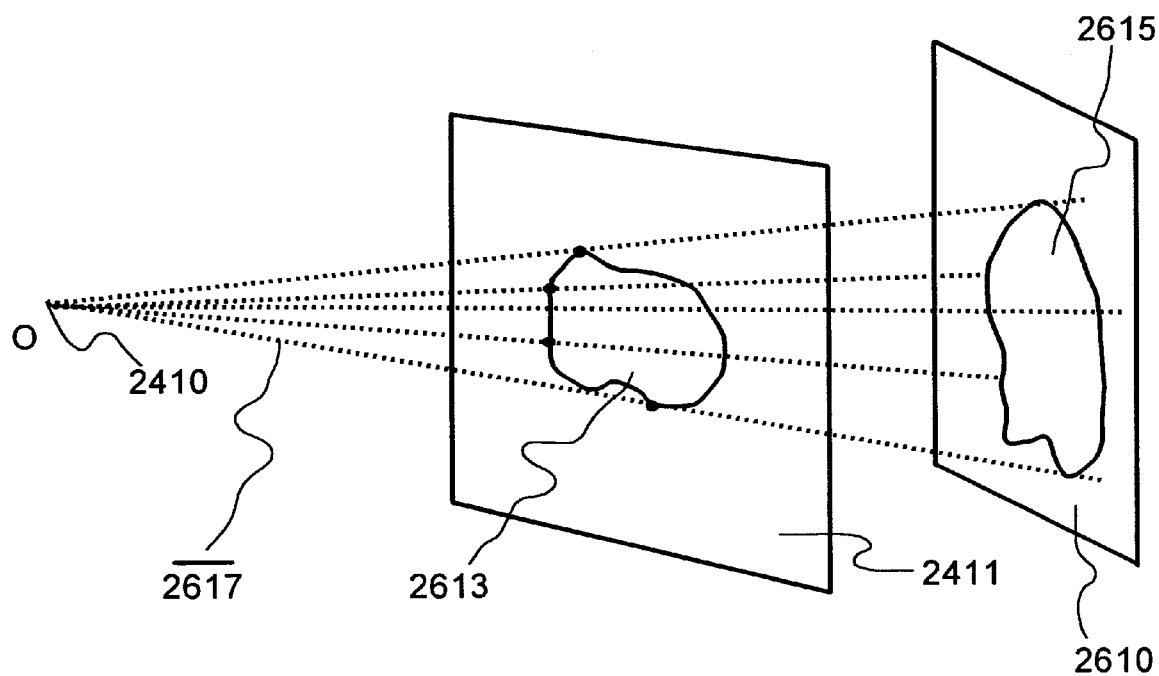
FIG. 26 is a view illustrating the making of a plane with the present invention.

When the plane is generated under the aforesaid process, a user then specifies a line becoming a contour of the plane on the actual image on the screen. For example, a user specifies a plurality of points placed on a contours calculated on the actual image. Upon inputting a specific command, the points are connected by a linear line or a proper curved line for example, a spline curved line or the like, and a closed region is defined on the projected plane. In FIG. 26, 2613 is the closed region on the projected image 2411. The aforesaid plane 2610 cut by a cube or projection lines 2617 enclosed by the closed region and the camera position 2410 on the three-dimensional space becomes a closed plane 2615 which is finally made.

Although various kinds of data structures of this plane can be applied, a following form is assumed to be used in the preferred embodiment.

| | |
|---|---|
| Reference point | (x1, y1, z1) |
| Nominal line vector | (nx, ny, nz) |
| Row of control points in closed region | (v1, u1) |
| | (v2, u2) |
| | (v3, u3) |
| Interpolation method | Linear line interpolation |

That is, they are three-dimensional coordinates of a certain point through which the plane passes, a nominal line vector indicating a direction of the plane, a row of control points indicating the closed region applied when the plane is cut, and the type of interpolation method applied as a method for connecting the control points and the like. These data are recorded in the three-dimensional data table together with the plane identification ID.

In addition, when a plane is made and its data are recorded, the program can overlap the plane on the actual image as a wire frame and display it in response to a request from a user. The plane is drawn on the three-dimensional space as a collection of wires divided properly in mesh. The graphic board overlaps and displays this wire frame on the actual image as an image seen with the same camera parameters as those of the actual image. In addition, it may display also the control points applied when a contour of this plane is specified so as to enable a correction of the shape to be carried out under an operation such as a mouse selecting and dragging by a user.

The foregoing is a method for making a plane. Next, a method for making a cube will be described. More particularly, as a method for making a cube, although a method for fitting a basic shape primitive can be applied in addition to a method to be described as follows, this will be described later. As to the production of the cube, since it is frequently found to be suitable that an exclusive CAD program for use in making another three-dimensional modeling is applied on the basis of the three-dimensional points or lines made by the present device rather than a detailed making with the present device, one example for it is merely applied.

One example of an applicable method for making a cube is a method in which the cube is made under a combination of three-dimensional obtained points, lines and planes already made. A user displays the three-dimensional points, lines and planes already attained on a screen through inputting a command. A user selects a proper one from them through a selecting and clicking operation of the mouse. For example, when a six-plane object is produced, a user specifies eight apex points constituting the six-plane object. When a user inputs a command to generate a six-plane object from the eight apex points, the device/program may then generate the six-plane object from the eight three-dimensional points. In another example, when a cone is generated, for example, a user selects a circle acting as a bottom part of the cone and a three-dimensional point becoming an apex point. When a user inputs a command to generate a cone with the bottom surface and the apex point, the device/program may then generate the cone in reference to the circle and the apex point. The program prepares a method for generating a cube under various conditions in reference to the points, lines or planes.

Figure 28:
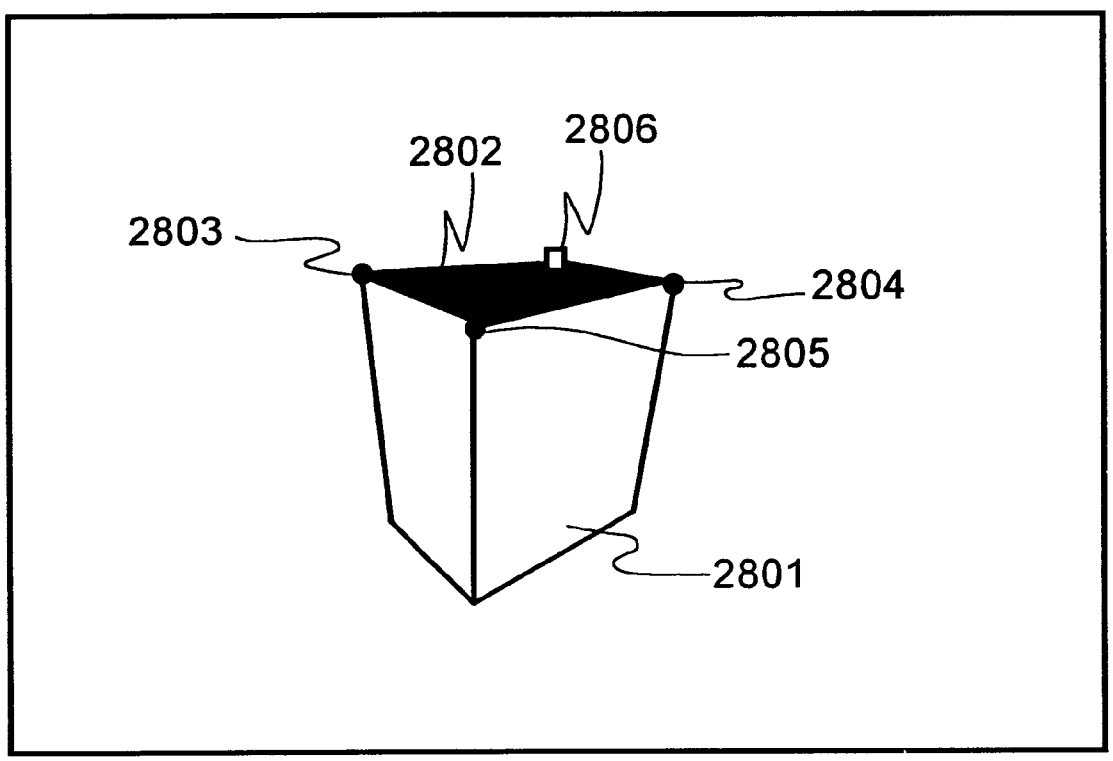
FIG. 28 is a view illustrating a basic figure in a discussion of the present invention.

An example of a method for making a cube has already been described above. Next, a method for making a three-dimensional shape using a basic shape primitive will be described. More particularly, a case in which a three-dimensional structure of a certain plane 2802 of an object 2801 as shown in FIG. 28 is made will be studied. If it is assumed that the object shown in the figure is judged as a cube under a knowledge of a user (e.g., the user knows from the actual image that the object is a cubic building), it is frequently found that it is more preferable that a shape is made by the following method rather than obtaining the three-dimensional coordinates of all the apex points 2803, 2804, 2805 and 2806.

Figure 27:
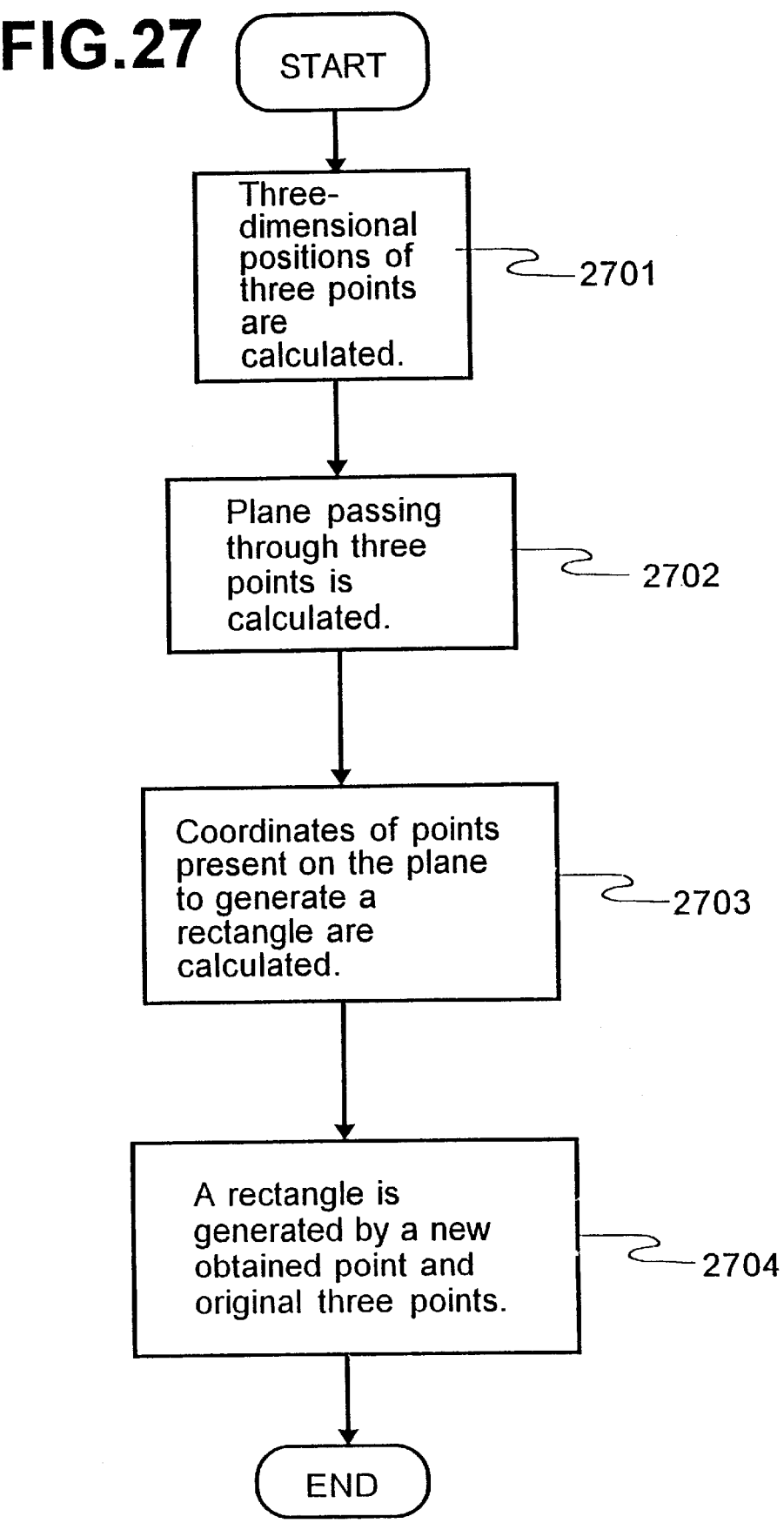
FIG. 27 is a flow chart illustrating a procedure of making a basic figure with the arrangement of the present invention.

A three-dimensional shape of the plane 2802 is generated. In view of the previous conditions, the plane 2802 becomes a rectangular parallelopiped plane. Thus, a position 2806 of a still further point is uniformly determined if the three positions 2803, 2804 and 2805 of them are obtained unless a position of each of the four apex points is obtained. Thus, a user makes this plane in accordance with the following procedure as shown in FIG. 27. At first, three-dimensional positions of the three points are calculated (step 2701) in accordance with the aforesaid method. A user may select the three points and issue a command to select a basic shape of a rectangle. The program may calculate a remaining one point from the three points in such a manner that a rectangle is formed in a three-dimensional space. At first, the program calculates (step 2702) a plane where the three points are present from the three points where the three-dimensional coordinates have already been calculated. Then, the points which are present on this plane and placed at distances of a long side and a short side of the rectangle from the two points are calculated (step 2703), and the points become the three-dimensional coordinates for the fourth point 2703. A shape connecting the four points becomes (step 2704) a target rectangle 2704. Each of the apex points on the screen is displayed as a control point and each are further clearly indicated as a movable point. A user can move any point (especially the fourth point) through an operation such as a selection and dragging with the mouse.

Figure 29:
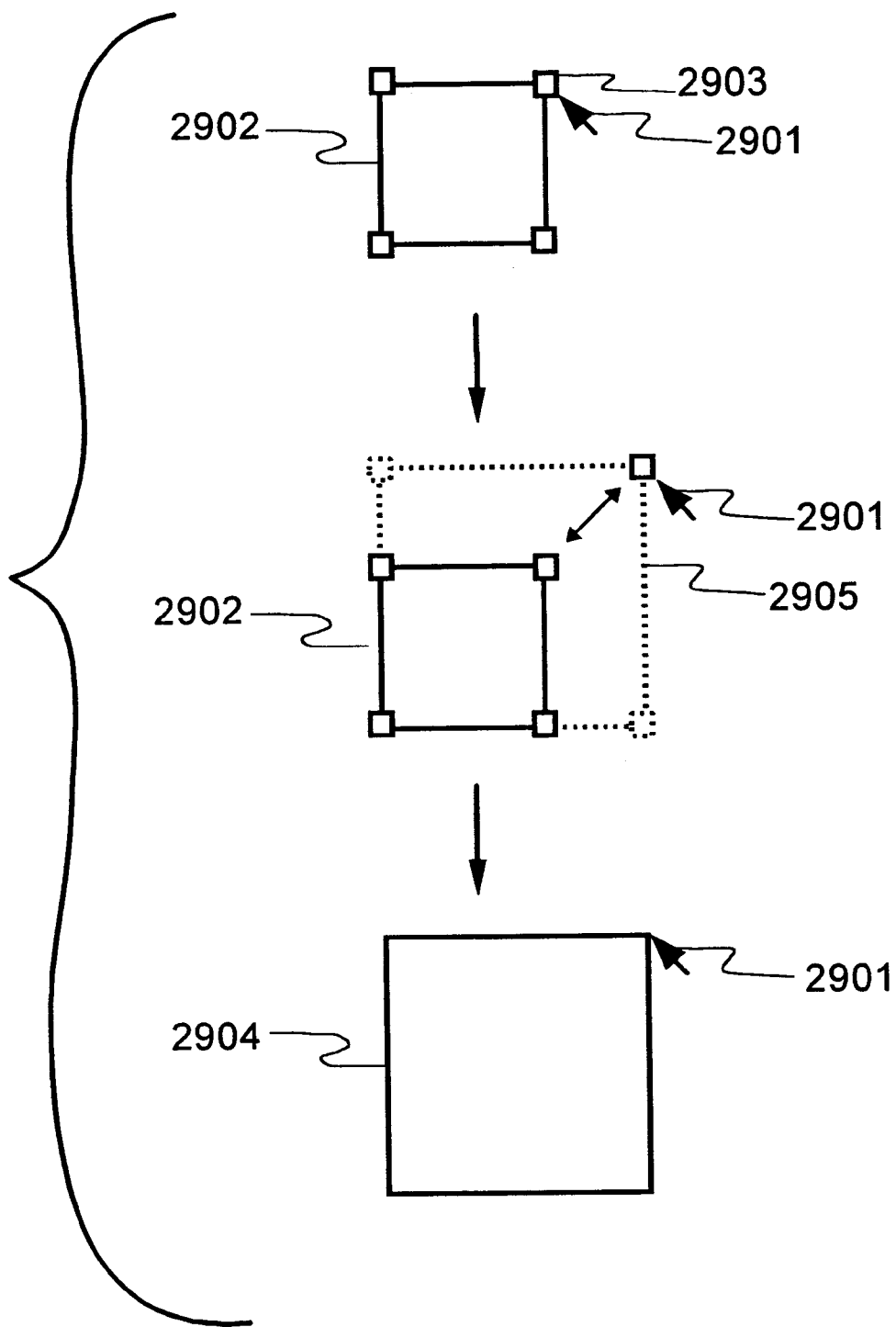
FIG. 29 is a view illustrating a method for correcting a basic figure using a two-dimensional drawing software with the present invention.

In the further discussions to follow, a procedure/program for making a figure on a two-dimensional plane which is generally distributed at present will be studied. Under such procedure/program, a user can change a size or a shape of the basic form with a basic feature of the basic form being applied as a restricting condition by moving the control point for the figure after the user selects the basic form. In the case that a rectangle is selected as a starting basic form, for example, a shape of the form is changed while its general rectangular shape in maintained when the apex points are moved as shown in FIG. 29. Each of the apex points of the rectangle 2902 is displayed by a dot 2903 as a control point. A user selects one of the apex (i.e., control or handle) points with the mouse cursor 2901 and drags it with the mouse cursor 2901, resulting in that a size of the rectangle is changed as shown by the phantom lined outline 2905 in FIG. 29. Upon a stopping of dragging and a release of the apex point, this figure becomes a corrected rectangle 2904.

Figure 30:
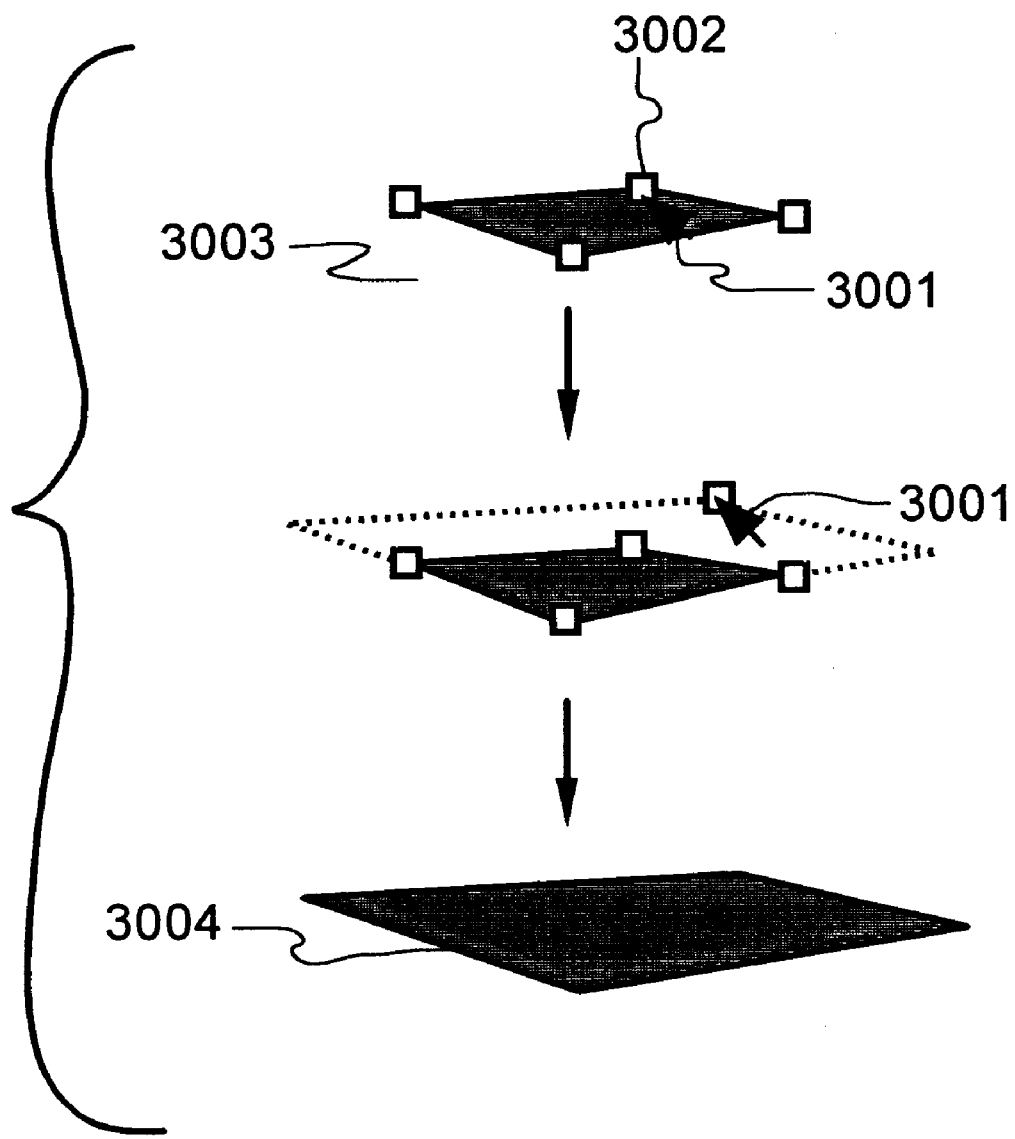
FIG. 30 is a view illustrating a method for correcting a basic figure in a three-dimension.

Although this is a method for changing a basic figure under a motion of the control point in a general drawing program, the present device enables this function to be realized in a three-dimensional manner. More particularly, FIG. 30 is a view for showing a part of the figure of FIG. 28. When a user selects a control point 3002 of a figure 3003 projected on the image and moves it by dragging with a mouse cursor 3001, the program adds, in the same manner as that of the two-dimensional drawing program, the conditions:

1.) that a position of an apex point is placed at a position orthogonal to the selected point;
2.) that directions of a long side and a short side are not changed;
3.) that a basic original shape (i.e., rectangle) is maintained; and
4.) that a plane where a rectangle is present is not changed, and thus a size of the rectangle on the three-dimensional space is changed as shown in the FIG. 30, while its basic original shape is maintained within the plane. The image displays the rectangle viewed on the projected plane. This allows a user to change a size of the rectangle 3004 while looking at the image seen on the projected plane.

With the foregoing, a method for making a three-dimensional shape (e.g., a rectangle) and its correcting method using the basic shape have been described. As a basic shape, there are many other shapes such as ellipses, polygonal shapes, a spline curved surface, etc., in addition to the rectangle, which are suitable for use in practicing the present invention. Further, the above-describe modification procedure/program is not limited to application to planer figures, but are also applicable for three-dimensional figures such as a cube. It is assumed that as for these figures, modified sizes or shapes can be specified through an operation on the projected image in the same manner as that for the rectangle.

The method for making the three-dimensional shape using such a basic shape has the following advantages. First, a number of steps required to define three-dimensional shapes by a user through an interactive mode is reduced. More particularly, in the case of the foregoing rectangle example, a user normally would be required to specify the positions of four points to obtain a rectangle, but with the device/program of the present invention, only the positions of three points are required to be specified and the remaining one point is automatically obtained. Thus, a degree of easiness to make the three-dimensional shape is increased, while a time required to do so is decreased.

As a second advantage, the shape can be made more accurately without any contradiction. For example, in the case where the making of a rectangle in the three-dimensional space is set as an example, when all the four apex points are separately obtained by the point making method described above, they may not necessarily be formed on the same plane due to an influence of error. In addition, there is no assurance that all the angles will be right angles. However, in accordance with the present method, since the basic feature of such a shape as above is always fulfilled automatically without contradiction, the shape becomes approximately an accurate shape.

Regarding a third advantage, movement or correction of the shape can be easily performed. More particularly, correction can be performed by the aforesaid method and as to the movement of the shape, elements such as lines or planes generating the basic shape can be treated as groups, such that a group can be moved easily by performing a respective movement of any one of the elements of the group.

With the foregoing, the method for malting the three-dimensional shape using the basic shape and its advantages have been described. In addition, in a case where a shape is made in accordance with the present method, it is assumed that the type of the basic shape applied when the shape is made is also recorded in the three-dimensional data table together with the coordinate values forming the shape. This is needed in the case that a correction is carried out later.

Next, a connection of the device/procedures of the present invention with an existing three-dimensional CAD system will be described.

One of the objects of the present device is to make a three-dimensional model of an item seen on the actual image with reference to this actual image as described above. However, it may occur that the model formation through the present device is not necessarily appropriate due to reasons such as a function or the like, dependent upon a shape or a feature of the model to be made. That is, it may be considered that a model of an item having a complex shape or an item expressed by a collection of curved surfaces or the like can be made easily and accurately by using a three-dimensional CAD device having a modelling program generally applied in the art, rather than by making the model by the present device. This is due to the fact that a function to make a complex figure is typically more fully equipped within a CAD device. Thus, in the case that such a model as above is made, it is preferable to use both the present device and the CAD device separately to make one model in such a way that a schematic model to be made by the present device basic size or position and the like is formed and its detail is made by the CAD device.

Figure 32:
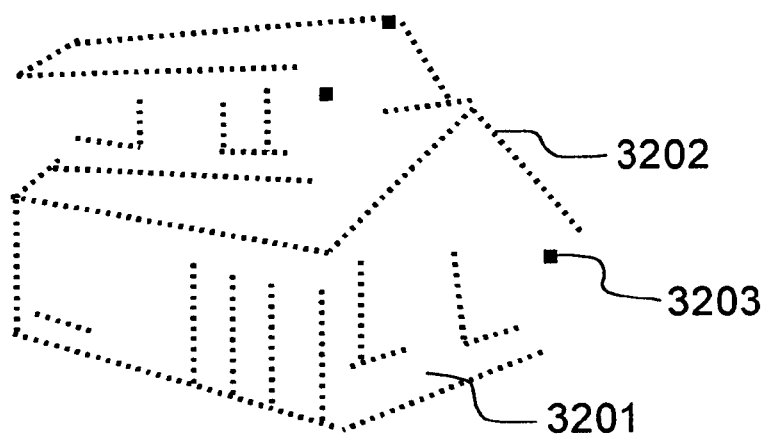
FIG. 32 is a view showing an example of data delivered to a CAD software.
Figure 33:
FIG. 33 is a view showing an example of model made by a CAD software.

An example of the above cooperative processing will be described as follows. More particularly, FIG. 33 shows a model to be made. It is assumed that an image of the real item is seen on the actual image. Since this model has a complex shape, it is not necessarily appropriate that such model be constructed using only the device/procedures of the present invention due to the aforesaid reasons. Thus, the present device at first makes the typical (i.e., general) shape of this item as shown in FIG. 32. The typical shape as defined herein is a shape of the outer-most contour of the item as shown in the figure, or a shape becoming a feature disclosing a position or clearance or the like of a shape constituting a part of the item such as a window or the like. In the example shown in the figure, a typical shape of the item 3201 is expressed as a collection of a feature lines 3202 and/or feature points 3203. In addition, the shape may be formed of a collection of planes or cubes, i.e., a configuration of component elements formed as easy as possible enables an operation or a correction through CAD performed later to be easily carried out. The data is delivered to an existing CAD device having a CAD program. Using the CAD program, a detailed model of the item is made on the basis of data supplied from the present invention. As shown in FIG. 33, the detailed data are made in such a way that the aforesaid line 3202 or point 3203 comes to the corresponding side or the apex point of the item. Since the typical shape of the item is made while directly interacting with the actual image with the device of the present invention, the three-dimensional shape or the three-dimensional position of the model 3201 made by the CAD program is very accurate. Once made within the CAD device, the detailed three-dimensional model data are delivered back to the device of the present invention and are displayed to be overlapped on the actual image. With such an arrangement as above, the user can confirm if the detailed model is accurately made and accurately placed in overlapping relation to the actual image.

Figure 31:
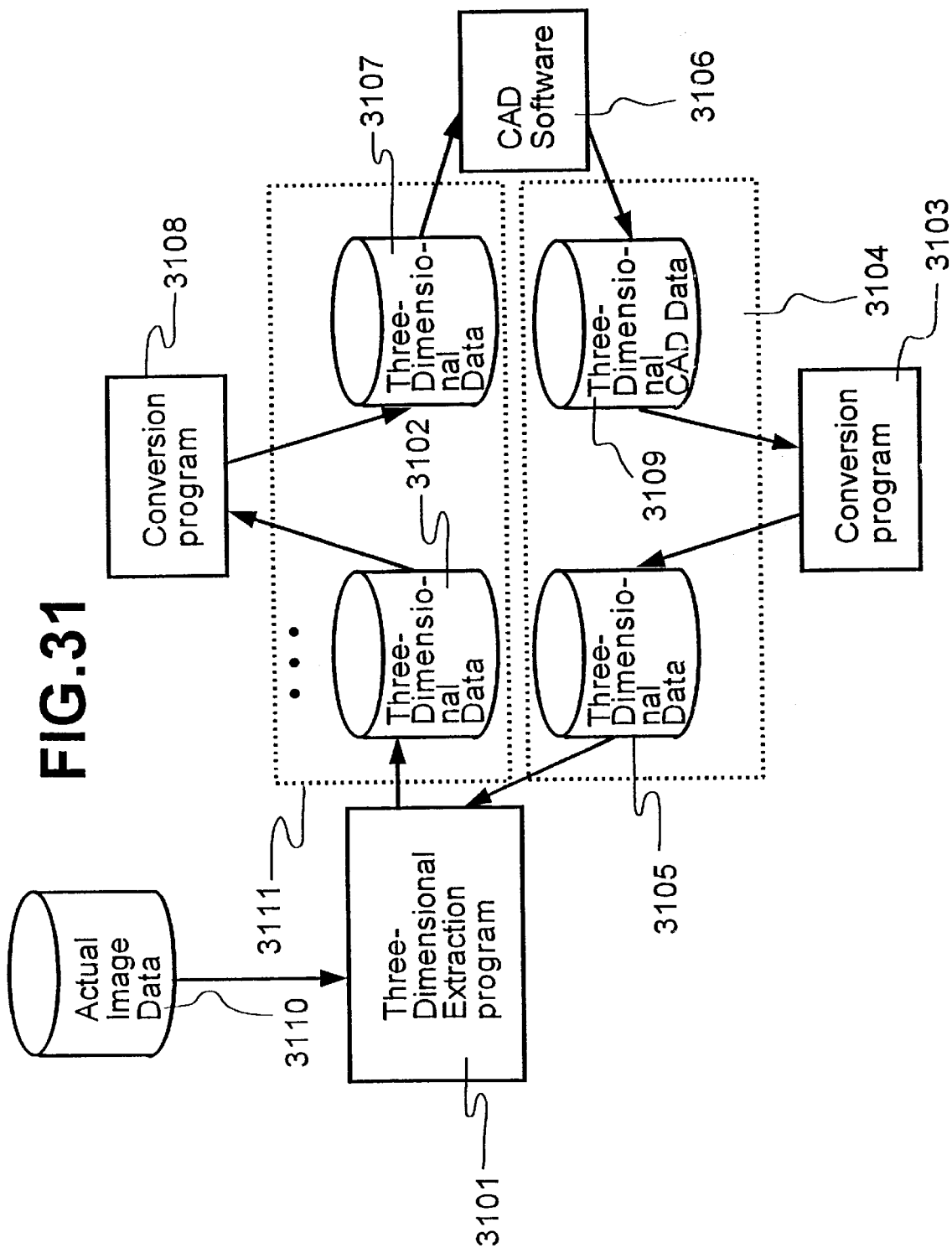
FIG. 31 is a view showing connection of an arrangement of the present invention with a three-dimensional CAD software.

FIG. 31 shows one example of a system configuration for realizing the present cooperative processing. In this example, the aforesaid existing three-dimensional CAD device is assumed to be one which is run on a usual computer with a program. Thus, the CAD device can be concurrently operated integrally with the computing configuration of the device of the present invention described in reference to FIG. 1, whereupon a CAD program is merely added on the main memory 111 of FIG. 1.

A user makes a typical shape a feature point, a feature line of a certain object from the actual image data 3110 using a three-dimensional extracting program 3101 of the device of the present invention. The data of typical shapes is defined as data structure 3102 of the present device and outputted to a main memory. A conversion program 3108 converts this data reading into three-dimensional CAD data 3107 appropriate for the CAD program and outputs it to the main memory. In addition, the conversion program 3108 is also stored in the main memory of the present device. A user energizes the CAD program 3106 stored in the main memory. The CAD program reads the CAD data 3107, and a user refers to this data and the actual image of the item displayed by the three-dimensional extracting program to make the three-dimensional detailed model of the object. The CAD program outputs the produced three-dimensional detailed model data to the main memory as the three-dimensional CAD data 3109. The conversion program 3103 converts this data into an appropriate data format 3105 for the present device and outputs it to the main memory. The three-dimensional extracting program reads this data, overlaps it on the actual image and displays it. A user looks at this displayed data, compares the made actual object model with the actual image and can confirm if it is accurate. Accordingly, the data within the dashed area 311 1 represents data for feature lines, points, planes and/or shapes of the actual object, whereas the data within the dashed area 3104 represents three-dimensional detailed model data.

With such an arrangement as above, the three-dimensional extracting program and the existing CAD program are concurrently run on the present device to cooperatively process with each other, whereby a user can make the three-dimensional model easily and accurately.

Figure 34:
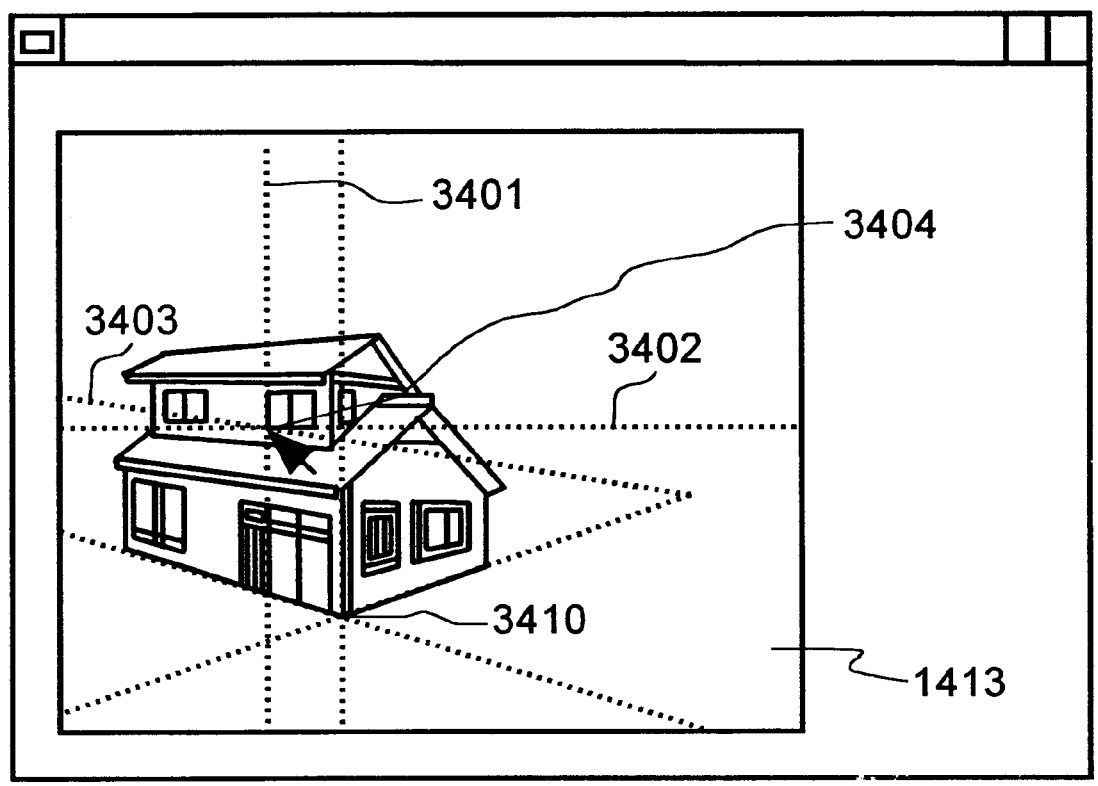
FIG. 34 is a view showing an example for defining an auxiliary line with the arrangement of the present invention.

An auxiliary function in the three-dimensional shape forming process performed in an interactive manner with the actual image as described above, will now be described, i.e., there will be described an auxiliary line displaying function. In the present making method, various kinds of restricting conditions are applied to calculate the three-dimensional position from the projected image. When the auxiliary line is displayed in response to a restriction condition, an operation which a user may easily understand can be provided. Making of the three-dimensional model of the actual image shown in FIG. 34 will be studied, for example.

In the case of modelling an item such as a building (FIG. 34), there are many shapes in such building which cross at right angles. Due to this fact, if the directions crossed at a right angle on the three-dimensional space are determined, there are many places in other portions where sides or planes are present in the crossing directions. If the crossing components are generated from the side surface of the object at the portion 3410 in the figure, for example, a separate location 3404 such as a part of the window is also positioned in a quite the same direction on the three-dimensional space. Thus, if the right angle crossing components 3401, 3402, 3403 are displayed as auxiliary or helpful guidelines lines when the model of the location of the window is made, it is easy to make the shape. As shown in the figure, the direction of the window frame is placed on the auxiliary lines 3401 and 3402.

Figure 35:
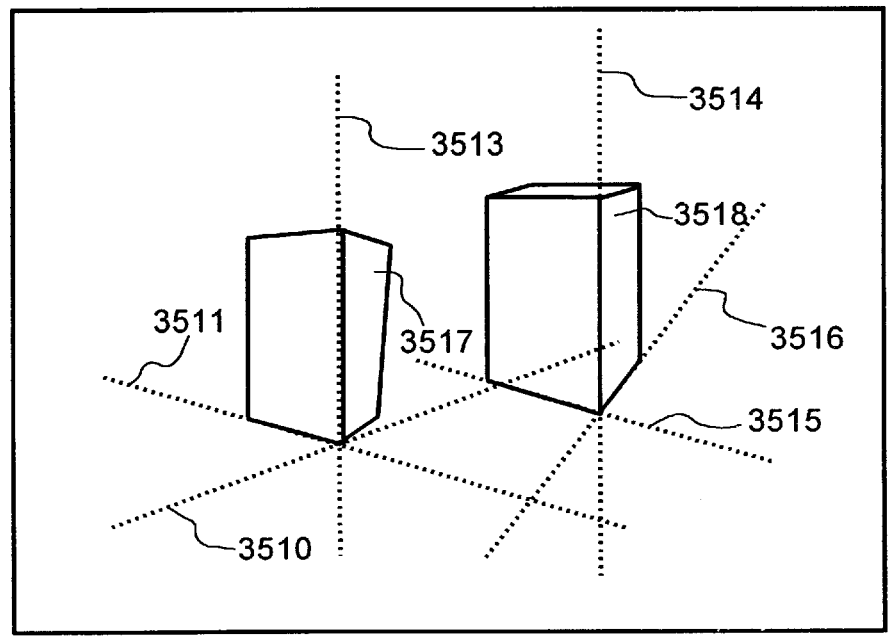
FIG. 35 is a view showing another example for defining an auxiliary line with the arrangement of the present invention.

FIG. 35 shows an example in which an object having different crossing components is present on the same screen. More particularly, FIG. 35 is a screen image showing buildings faced in different directions. In such a case, appropriate auxiliary or guide lines are displayed with each of the crossing components when each of the objects is made. That is, when the object 3517 is made, the auxiliary lines 3510, 3511, 3513 are displayed as helpful guides when a shape of three crossing sides is made. Alternatively, when the object 3518 is made, the auxiliary lines 3514, 3515, 3516 are displayed as helpful guides when a shape of three crossing sides is made.

Figure 36:
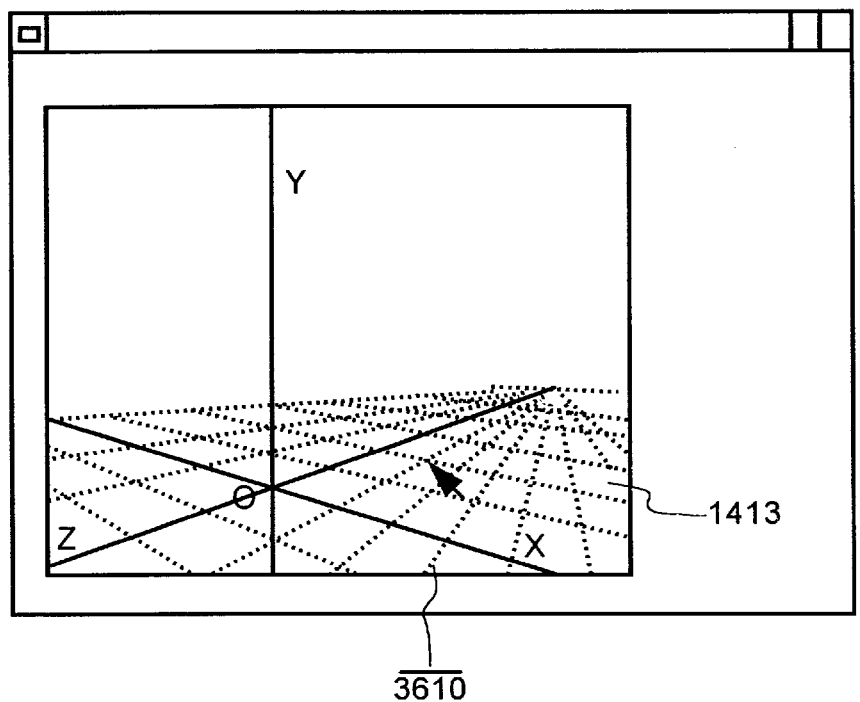
FIG. 36 is a view showing an exemplary perspective grid using the present invention.

Discussion now turns to an auxiliary grid displaying function. Auxiliary lines grids according to a certain rule are overlapped on the actual image and displayed. When a three-dimensional shape position of the object contacting with the ground is made, for example, if the grids 3610 are displayed for every certain spacings on the plane of $$Y=0$$

as shown in FIG. 36, a visual confirmation of a positional relation of the object can be easily attained. At this time, it is satisfactory that the following linear lines are delivered to the three-dimensional graphic board together with the camera parameters and drawn.

$$(X, 0, \infty)\text{-}(X, 0, -\infty)$$

where X=. . . −50, −40, −30, −20, −10, 0, 10, 20, 30, 40, 50, . . .

$$(\infty, 0, Z)\text{-}(-\infty, 0, Z)$$

where Z=. . . −50, −40, −30, −20, −10, 0, 10, 20, 30, 40, 50, . . .

Next, discussion turns to the auxiliary function of historical recording. In the present device, a plurality of different making methods may be utilized when a certain point or a certain line is made. There is a possibility that even the same points or same lines may be applied to form shapes which are slightly different from each other in view of their three-dimensional data, dependent upon a selection of the method. Then, auxiliary information such as what conditions, what kind of reference points or what kind of auxiliary lines are applied when each of the three-dimensional shapes is made, is added to the three-dimensional data table illustrated in FIG. 23. With such an arrangement, when produced data is corrected or confirmed later, the auxiliary information is displayed to enable the work to be performed easily and accurately due to the fact that the restricting condition is not needed to be inputted again and the process to be corrected may easily be performed.

In addition, when a reference point of a certain figure and the figure concerning a restricting condition are corrected, adding of the historical recording function enables a shape of figure made in reference to the correction to be automatically changed.

As to an auxiliary image processing display function, there is a possibility that a user may easily understand the work by performing a certain image processing to display its result rather than by displaying the actual image as it is. For example, if the differential processing for the image is carried out, its edge is intensified (e.g., via differential processing), so that a contour line of the object seen on the actual image may easily be extracted. Accordingly, there is provided such an auxiliary image processing display function to change over such an image as above and to display it in response to a request of a user.

Further discussion turns to an auxiliary three-dimensional model rotating motion displaying function. Since the produced three-dimensional model of the object is overlapped on the actual image and displayed, an apparent shape on the projected image can be confirmed, although it may not be confirmed how it is produced in a three-dimensional manner. Then, there is provided a function to cause the produced three-dimensional model to be rotated on the actual image, moved and displayed and confirmed in a three-dimensional manner under an instruction from the user. More particularly, description is made in reference to FIG. 38.

Figure 38:
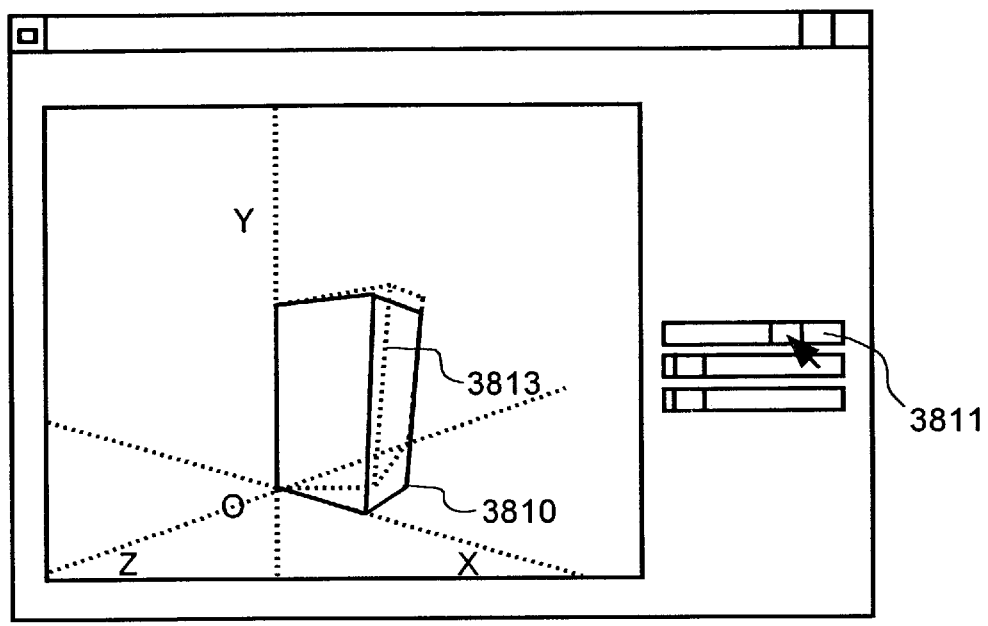
FIG. 38 is a view showing an exemplary computer screen in which a CG model is rotated, moved and displayed.

On FIG. 38, there is displayed an object 3810 of the actual image. It is assumed that a user makes the three-dimensional model of this object. Thus, on the screen is displayed the model while being overlapped on the object 3810 as a wire frame with a certain color, for example. A user rotates, moves and displays this three-dimensional model on the image through a button operation, a scroll bar operation or the like, on the screen. In this example, it is assumed that when the scroll bar 3811 is scrolled, the model on the image is rotated only by an angle of amount where it is moved around the X-, Y-, Z-axes. A figure 3813 is a three-dimensional model after a rotating operation. With such a display as above, it is possible to display and confirm a placement and depth of the produced model in a three-dimensional manner, in a real time based on the image.

Figure 37:
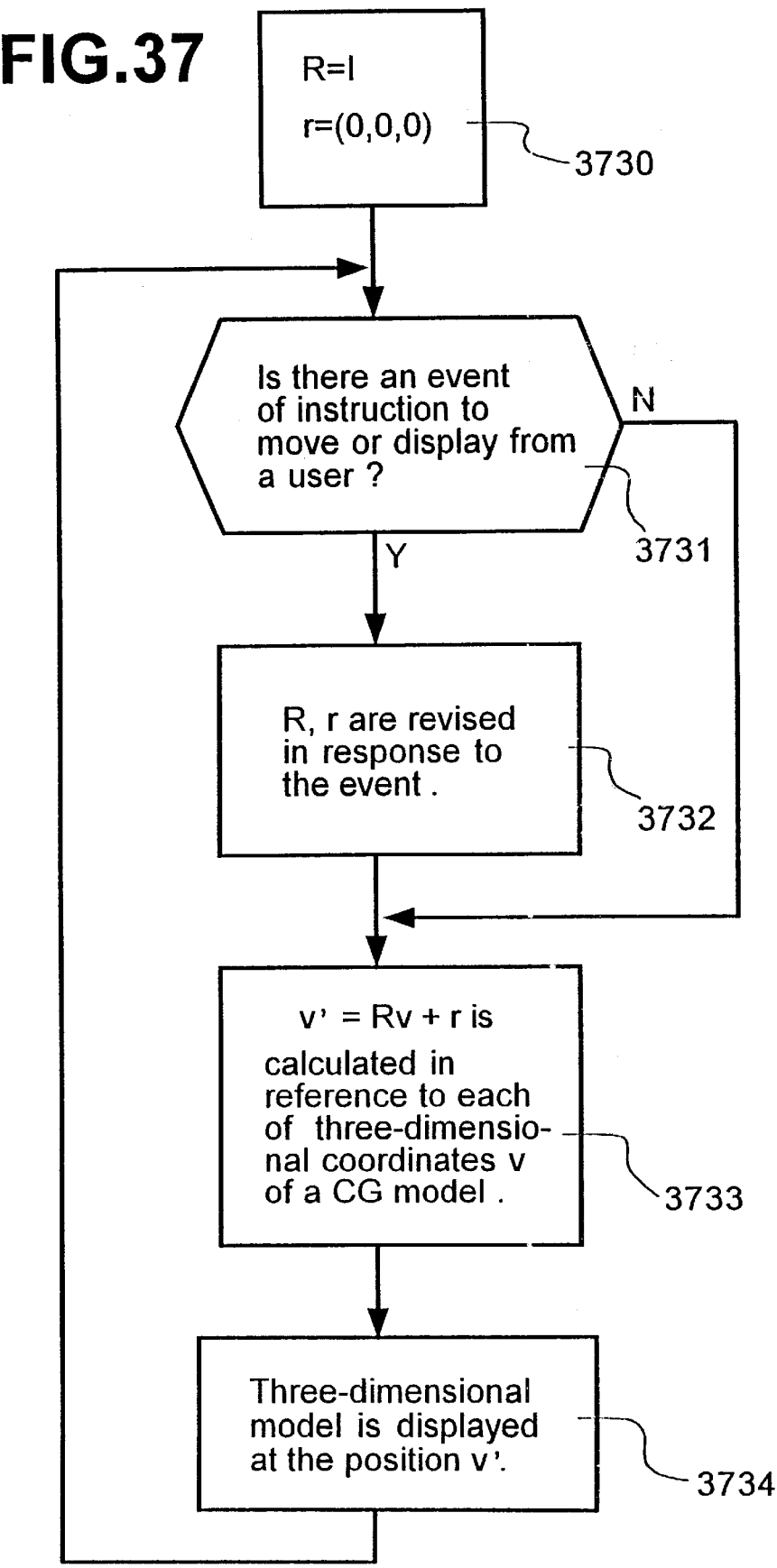
FIG. 37 is a flow chart illustrating a procedure to rotate, move and display a CG model using the present invention.

FIG. 37 shows a flow chart corresponding to a moving or rotating operation. At first, as an initial value, a unit array is set (step 3730) to the rotary array R and 0 of a moving vector. The occurrence of an event designating a moving or rotating operation, such as a scroll bar or the like performed by a user, is monitored (step 3731) and in the event of such occurrence, the values of the rotary array R and the moving vector r are revised (step 3732) in accordance with the value inputted during the event. The coordinate values of the CG model are converted (step 3733) into the values of rotary array R and the moving vector r, and then the camera parameters and the values are delivered to the graphics board and the model is displayed (step 3734) on the screen. Repeating of the aforesaid operation enables the model after rotation and motion instructed by a user to be displayed in a real time.

Figure 39:
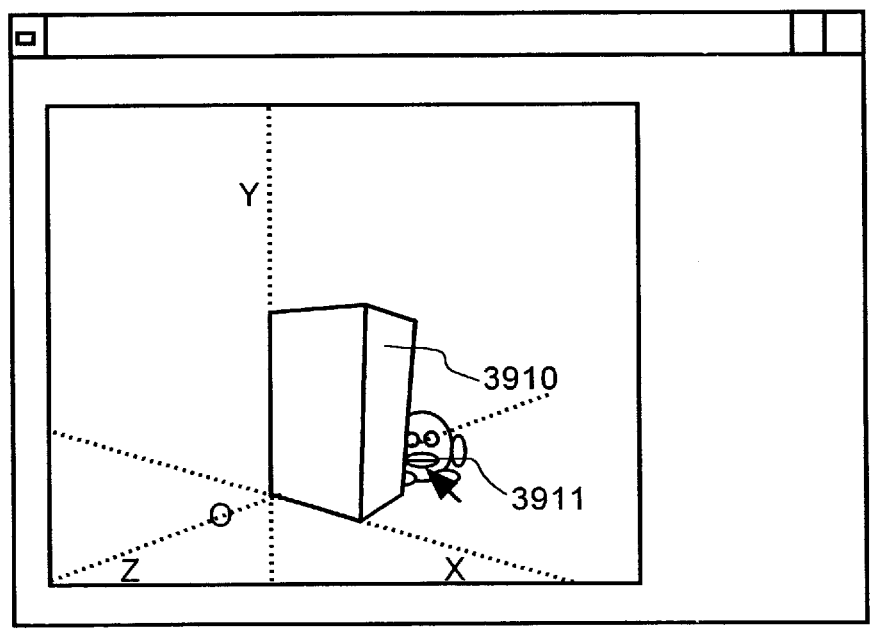
FIG. 39 is a view showing an exemplary computer screen in which a synthesized image is displayed together with a reference object.

Discussion turns still further to an auxiliary reference object displaying function. Such has a function to overlap the CG model made in advance with the camera parameters calculated by the present device on the actual image and to display it. As shown in FIG. 39, applying this function enables a user to display a reference object 3911 made in advance at an optional position with respect to an actual object 3910 on the three-dimensional space seen on a screen. A user can move this object to an optional position through an operation of a mouse and the like. A user can check in a visual mode an alignment state of the camera parameters by confirming how the reference object is seen with the calculated camera parameters. That is, when this object is moved far in a three-dimensional manner, for example, it is possible to confirm whether or not the object is seen at a location far from the actual image on a screen. In addition, when a model of the object seen in the actual image is made, a mask image with the model made as described above enables an image having a reference object hidden by the object in the actual image or an image seen with a shadow of the reference object in the actual image to be made. The figure shows an example in which a part of the reference object 3911 is hidden by an actual object 3910 in the actual image. Applying this function enables a user to visually determine whether or not the three-dimensional object in the produced actual image is accurately made, or to confirm whether or not its forward or rearward relation is accurate.

With the foregoing, preferred embodiments of the present invention have been described in reference to its examples.

Figure 40:
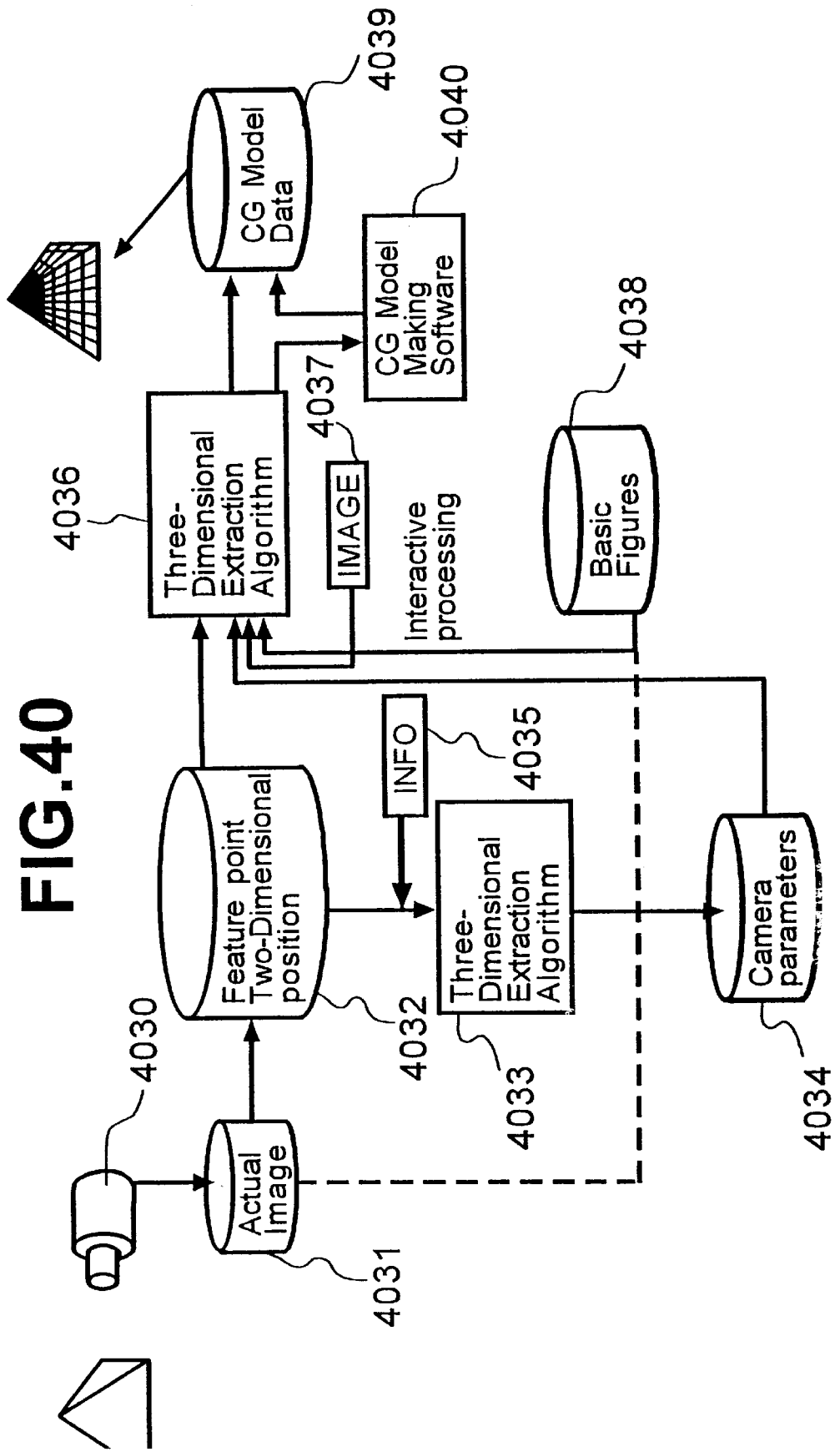
FIG. 40 is a view showing an entire schematic representation of an arrangement of the present invention.

As a summary, a schematic overall state of the present invention will be described with reference to FIG. 40. More particularly, it is an object of the present invention to perform an on-screen calculation and determination of camera parameters 4034 when the actual image is taken through an interactive operation of a user in reference to the actual image 4031 projected by a camera 4030 or the like, and to perform an on-screen calculation and determination of three-dimensional CG model data 4039 of the object contained in the image.

At first, a user prepares an actual image data 4031, e.g., via digital imaging, analog imaging with A/D converter, etc. The image is displayed on the screen of the device. A user at first inputs two-dimensional coordinate values required for obtaining the camera parameters of the actual image in reference to the image through an interactive processing 4032. In the aforesaid preferred embodiment, such coordinates pertain to a lost-point and right-angle crossing directions. Concurrently, a condition for obtaining the camera parameters in the present example, in reference to the lost-point and the right-angle crossing directions is indicated as a knowledge information 4035.

The program performs a calculation with a three-dimensional extracting algorithm 4033 in reference to such information so as to obtain camera parameters 4034. Upon obtaining the camera parameters, the program allows designation of three-dimensional CG model data 4039 with a three-dimensional extracting algorithm 4036, i.e., making reference to: two-dimensional coordinate values seen on the image; camera parameters; various knowledge information of an object seen in an image 4037 which is vertical to the ground surface or which is a rectangular parallelopiped or the like; and features of a basic figure 4038 constituting a three-dimensional model concerning sub-figures such as points, lines, planes, type of a cube, a classification of a linear line and a curved line or the like. A unique and novel advantage of the device/procedure of the present invention is that camera parameters and three-dimensional CG model data can be determined directly using only a single actual image, and further, data determined with the present invention can be cooperatively processed with other (complementary) CG model making software 4040 such as a general-used CAD device. In this way, it is possible to make the camera parameters and the three-dimensional CG model data of an object seen on an actual image while referencing the actual image.

Figure 41:
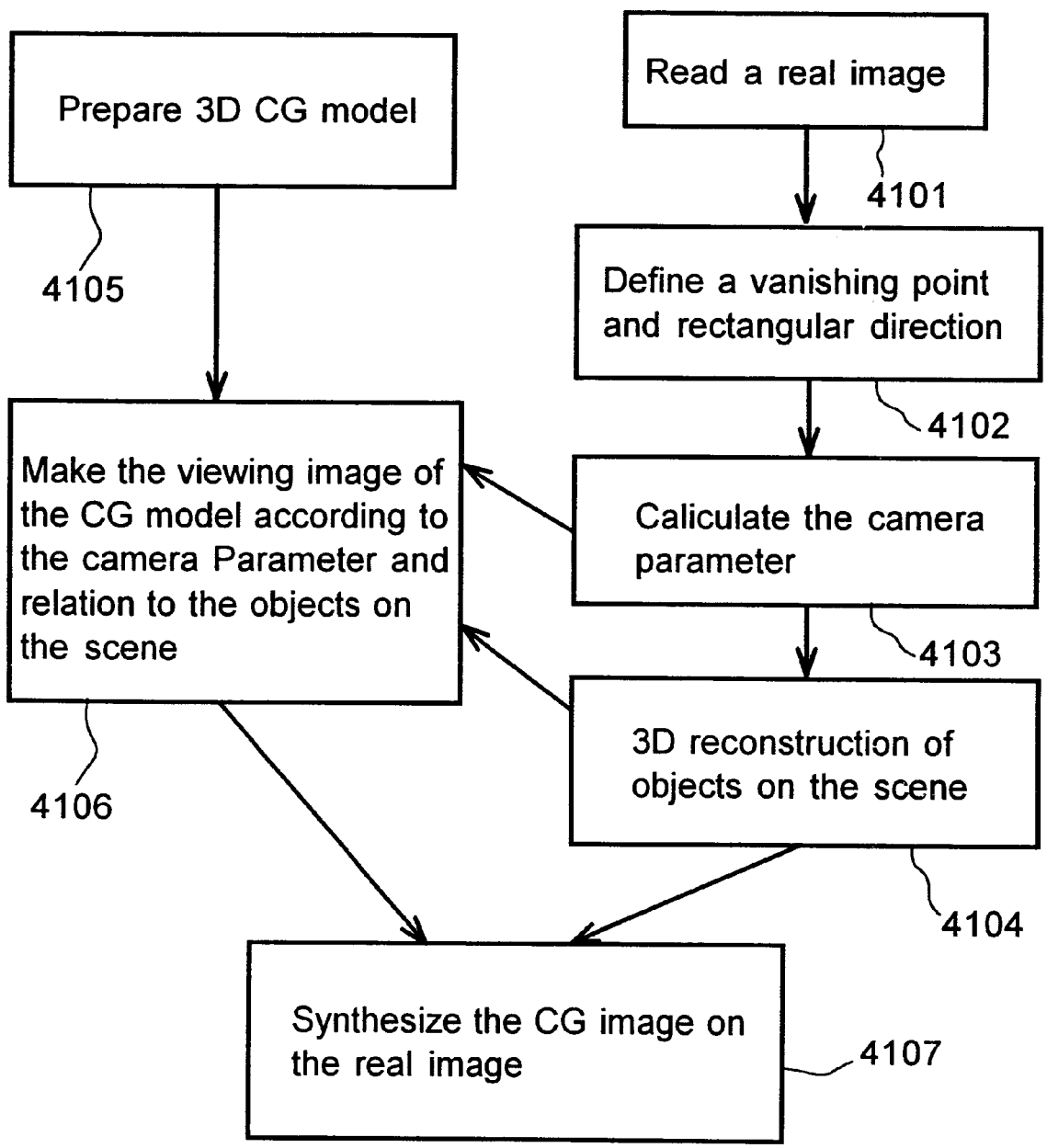
FIG. 41 illustrates a generalized flowchart of steps conducted to synthesize a CG image onto a real image.

FIG. 41 illustrates a generalized flowchart of steps conducted to synthesize a CG image onto a real image. More particularly, in step 4101, a real image is read, e.g., via scanning of a hardcopy image, real-time photography, from previously stored image data, etc. It is important to note that within the present invention, determination of camera parameters, extraction of 3-D image data of objects and determination of 2-D CG image data are all preferably and advantageously conducted using a single frame picture image (i.e., as opposed to having to use multiple differing frames to determine camera parameters, etc.). In step 4102, user interaction with the single frame picture image defines a vanishing or lost point and a rectangular orthogonal coordinate system. Such data is then utilized in step 4103 to calculate camera parameters. Then additional user interaction is utilized in step 4104 to define/reconstruct 3-D objects within the single frame picture image, i.e., to extract point, line, etc. data of world objects within the single frame picture image. In step 4105, data pertaining to a 3-D CG model are prepared, i.e., data defining size, appearance, color, shape, etc. of the 3-D CG model. In step 4106, the prepared 3-D CG model data (from step 4105), calculated camera parameters (from step 4103) and extracted 3-D world object data (from step 4104) are all utilized to construct a 2-D image of the 3-D CG model suitable for combination with and overlaying on the single frame picture image. Finally, in step 4107, the 2-D image (from step 4106) and the 3-D world object data are used to synthesize a combined special effects image consisting of the single frame picture image overlaid with the 2-D image of the 3-D CG model.

Figure 42:
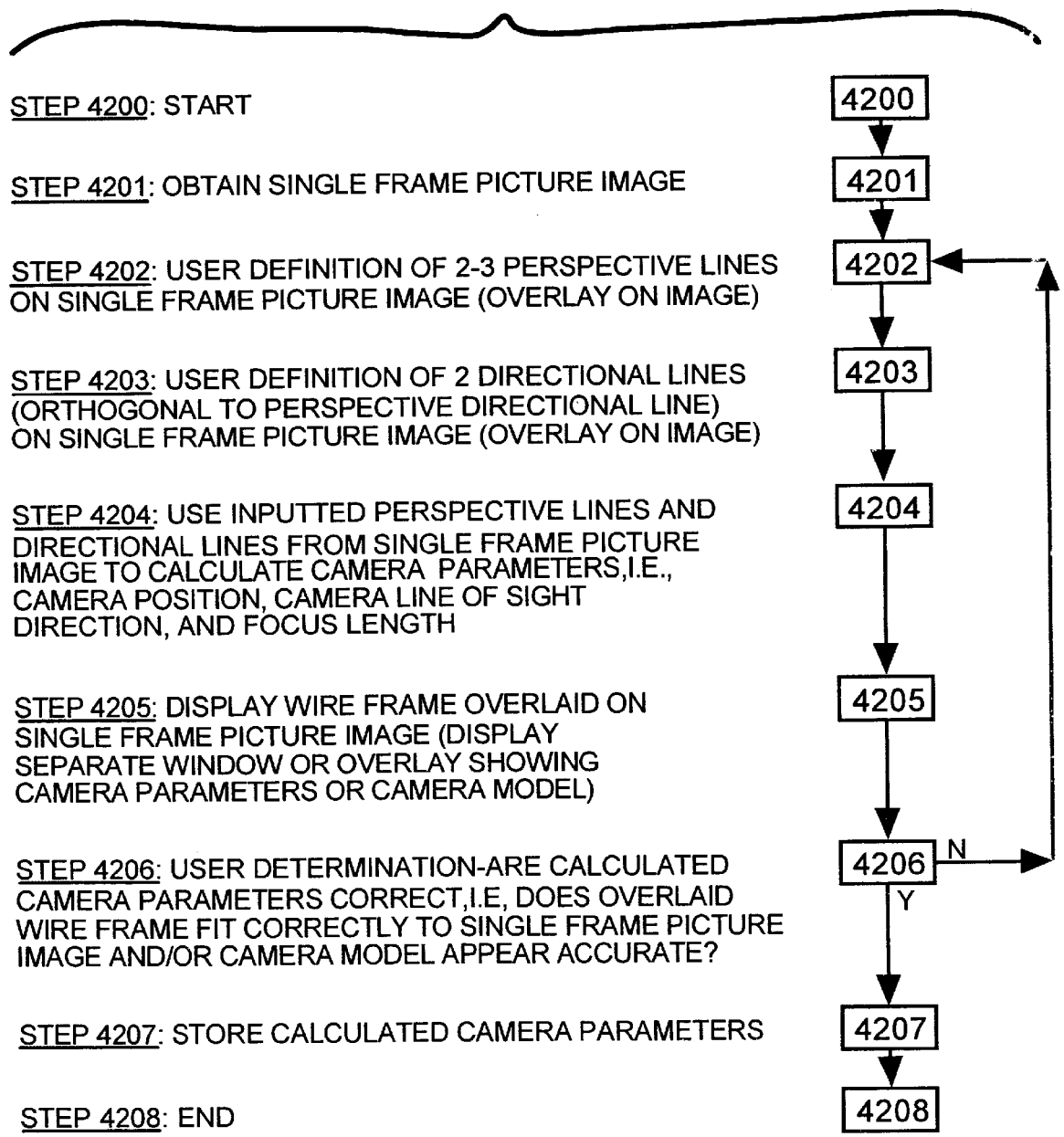
FIG. 42 illustrates flowchart steps conducted to determine camera parameters using a single frame picture image.
Figure 44:
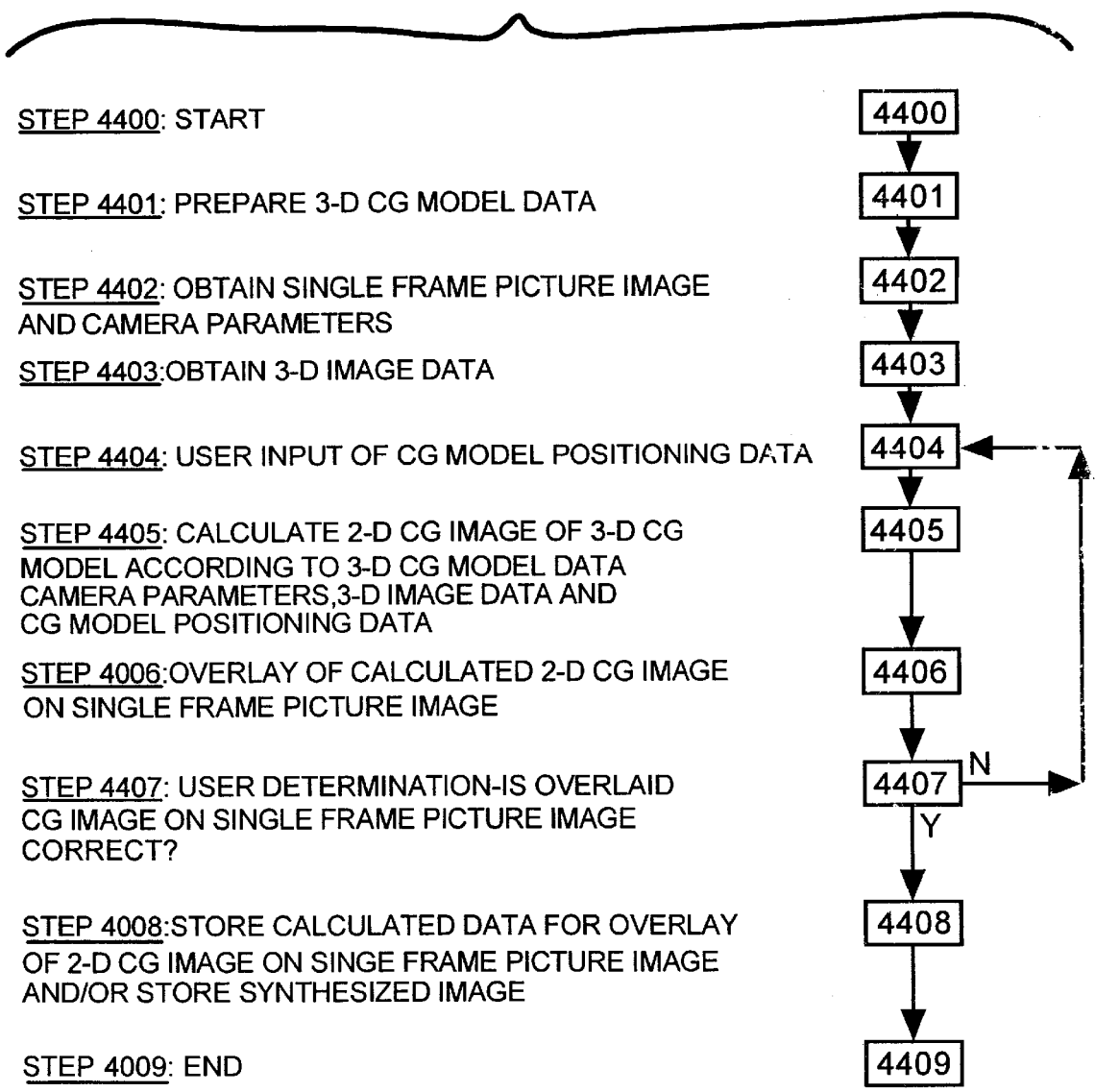
FIG. 44 illustrates flowchart steps for determining 2-D CG image data for overlay of a 2-D CG image on the single frame picture image.

FIGS. 42–44 will now be used to give more detail regarding several of the FIG. 41 steps. More specifically, FIG. 42 illustrates more detailed flowchart steps of the FIG. 41 steps 4102–4103 conducted to determine camera parameters using a single frame picture image. Step 4200 represents a start of such process. In step 4201, the single frame picture image of which a special effects CG image is to be added is obtained. In step 4202, a user views the single frame picture image on a computer display, and interacts with such frame so as to define two or three perspective lines on the single frame picture image, i.e., the user selects lines on the image which are known to represent substantially parallel lines on real world objects (e.g., parallel window frames of a house, etc.). Defined lines can be distinctively overlaid onto the single frame picture image via numerous methods, e.g., overlaid as lines of distinctive color. In step 4203, the user again interacts with the frame to define two directional lines which are known to represent directions which are substantially orthogonal to a perspective direction of one of the previously defined perspective lines, e.g., a line including a ground-contacting edge of a house can be used to define a first, i.e., perspective direction, whereas a ground-contacting edge of a differing orthogonal side of the house can be used to define a second orthogonal direction, and finally, a vertical house corner which intersects both such ground-contacting edges can be used to define a third orthogonal direction, whereas the intersection point of such directional lines can be used as an arbitrary origin (i.e., 0,0,0 point). In a preferred embodiment, perspective and orthogonal directional lines are user-defined via selection of appropriate points with a computer mouse interface to define lines, and adjustment of the defined lines as discussed above. However, the present invention includes arrangements which utilize methods which automatically determine and define perspective and orthogonal directional lines, e.g., appropriately programmed computers utilizing differentiation methods to extract appropriate edges from the image and/or utilizing fuzzy logic methods. Such automatic arrangements preferably allow for user confirmation and acceptance of the determined/defined lines.

In step 4204, the defined perspective and orthogonal directional lines from the single frame picture image are used to calculate camera parameters, i.e., camera position, camera line of sight direction and focus length. The above-described (and other well-known) mathematical methods/formulas are used to perform such calculations, i.e., via appropriate computer programming. Again, the defined perspective and orthogonal directional lines effectively define what is termed a "world coordinate system" (i.e., define a coordinate system with respect to a real world object), and the camera parameters effectively define what is termed a "projection (or camera) coordinate system" (i.e., define a coordinate system with respect to a projection viewpoint of the single frame picture image from a camera position). For visual verification, in step 4205, a wire frame pertaining to the world coordinate system can be distinctively overlaid onto the single frame picture image via numerous methods, e.g., overlaid as lines of distinctive color. Further, a projection coordinate system (i.e., camera) model can be overlaid or provided in a separate display window and/or numerical values for the calculated camera parameters can be displayed. In step 4206, a user visually determines whether the calculated camera parameters appear to be correct, i.e., does the overlaid wire frame fit correctly to the single frame picture image and/or does the camera model or numerical camera parameter values appear correct? If incorrect (designated by no path N), the process returns to step 4202 so as to allow user reentry or tweaking (i.e., adjustment) of the perspective and orthogonal directional lines, and corresponding recalculations. If correct (designated by yes path Y), the calculated camera parameters are stored in the step 4207. Step 4208 defines an end of the camera parameter determining process.

FIG. 43 illustrates more detailed flowchart steps of the FIG. 41 step 4104 conducted to extract 3-D image data of objects from the single frame picture image. Step 4300 represents a start of such process. In step 4301, the single frame picture image from the FIG. 42 process and having the defined world coordinate system (i.e., axes and origin) overlaid thereon, is displayed. In step 4302, the user again interacts (e.g., via computer mouse) with the single frame picture image, this time to define characteristic points and/or lines of real world objects so as to define a 3-D model of the same. Computer mouse inputting is, in a preferred embodiment, complemented or accompanied with keyboard inputting of relevant relating information, e.g., if a user is inputting characteristic points or lines which are known to exist on a same plane (e.g., a roof-top plane of a building), keyboard entry of appropriate commands can designate such points/lines as exiting in a same plane. Automatic computer determination of characteristic point/lines, together with user confirmation/acceptance, is also appropriate.

At appropriate times (e.g., at timed intervals or upon entry of each characteristic point/line), the single frame picture image can be overlaid (step 4303) with a calculated wire frame of a 3-D world objects model defined by the characteristic points/lines. The above-described (and other well-known) mathematical methods/formulas are used to perform such calculations, i.e., via appropriate computer programming. Again, the calculated wireframe can be distinctively overlaid onto the single frame picture image via numerous methods, e.g., overlaid as lines of distinctive color. In step 4304, a user visually determines whether the overlaid wire frame appears to be correct, i.e., does the overlaid wire frame fit correctly to the image of the world object? If incorrect (designated by no path N), the process returns to step 4302 so as to allow user reentry or tweaking (i.e., adjustment) of characteristic points/lines, and corresponding recalculations. If correct (designated by yes path Y), a step 4305 user determination is made as to whether a user has finished defining characteristic points. Such determination is preferably made by displaying an appropriate polling message on the display, and obtaining a corresponding user input via the computer mouse or keyboard. If unfinished (designated by no path N), the process returns to step 4302 so as to allow user entry of further characteristic points/lines. If finished (designated by yes path Y), the extracted 3-D image data pertaining to a 3-D model of the world object are stored in the step 4306. Step 4307 defines an end of such process.

FIG. 44 illustrates more detailed flowchart steps of the FIG. 41 steps 4105–4107 conducted for determining 2-D CG image data for overlay of a 2-D CG image on the single frame picture image. Step 4400 represents a start of such process. In step 4401, 3-D CG model data of a special effects object to be added to the single frame picture image is prepared, e.g., through any of various known methods such as CAD processes. In step 4402–4403, the single frame picture image, camera parameters and 3-D image data (pertaining to the world objects) from the FIGS. 42–43 processes are obtained. Although unnecessary, the defined world coordinate system (i.e., axes and origin) and the wire frame of the 3-D world objects model (from FIG. 43) can again be displayed (i.e., overlaid) on the single frame picture image. In step 4404, a user inputs CG model positioning data, i.e., inputs a location or coordinates where the CG image is to exist and appear within the image. Within step 4405, there is calculation of a 2-D CG image of the 3-D model according to the 3-D CG model data, camera parameters, 3-D image data and CG model positioning data.

For visual verification, in step 4406, the calculated 2-D CG image is overlaid onto the single frame picture image. In step 4407, a user visually determines whether the calculated 2-D CG image appears to be correct, i.e., does the overlaid 2-D CG image fit correctly and naturally on the single frame picture image? If incorrect (designated by no path N), the process returns to step 4404 so as to allow user reentry or tweaking (i.e., adjustment) of the CG model positioning data, and corresponding recalculations. If correct (designated by yes path Y), the calculated data for overlay of the 2-D CG image and/or the data of the overlaid image are stored in the step 4408. Step 4409 defines an end of such process.

While the above FIGS. 42–44 processes have been described as separate processes, in a preferred embodiment such processes actually continue without interruption from one to the other with a corresponding continuing use of data from prior processes, such that the FIGS. 42–44 processes appear to a user as a single ongoing process. As a further note, computer programming of the preferred embodiment and above processes varies tremendously from one computer implementation to another, and persons skilled in the art are most familiar with their own computer implementation and possess high degrees of mathematical and computer programming skills so as to allow practice of the present invention without undue experimentation.

In the present invention, since the actual image is directly used so as to make a CG model, it is possible to make a model through an operation which is visually understandable to a user. In addition, in the present invention, since the camera parameters can be determined directly from a single image, it is not necessary to set or record the camera parameters when an image is actually taken with a camera, and further, it is also possible to apply CG modelling to any previously taken image (e.g., vintage or historical footage) of which camera parameters are not known. Although there is a disadvantage that a model may become one which is not accurate in a three-dimensional mode due to an influence of error and the like in reference to a degree of resolution of an image or an accuracy of a lens and the like, the production of a synthetic image between the actual image and the CG to be seen as a main form of utilization of the present invention extracts directly a three-dimensional structure from the actual image applied for a synthetic combination, resulting in that a synthetic three-dimensional structure having no contradiction can be obtained in the image.

In accordance with the present invention, a three-dimensional model of an item seen on an actual image is made, resulting in that it is possible to make a model which is visually understandable. In addition, it is not necessary to record the camera parameters when the actual image is taken with a camera. In addition, in the case that the produced model is applied to an object to synthesize the actual image with CG, it is possible to make data having no contradiction with an actual image.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. An image processing apparatus implemented by a computer, comprising:

an image data apparatus for supplying single picture frame data corresponding to a single frame picture image;

a display displaying the single frame picture image corresponding to single picture frame data;

a camera parameter apparatus for determining from one of the single picture frame data and the displayed single frame picture image, camera parameters of a camera used to image the single picture frame data; and a 3-D model extracting apparatus using the camera parameters with respect to the single frame picture image, for extracting 3-D model data for at least one object from one of the single picture frame data and the displayed single frame picture image;

wherein the camera parameter apparatus comprises:

a designating apparatus for designating with respect to one of the single picture frame data and the displayed single frame picture image, at least two parallel perspective lines and two orthogonal lines; and a calculating apparatus for calculating, using the at least two parallel perspective lines and the two orthogonal lines, the camera parameters including a camera position, a camera line of sight direction and a focus length.

2. An apparatus as claimed in claim 1, wherein the designating apparatus comprises a user input device including at least one of a computer mouse and computer keyboard, and the at least two parallel perspective lines and two orthogonal lines are interactively designated on the displayed single frame picture image by a user with the user input device.

3. An apparatus as claimed in claim 1, wherein the designating apparatus is arranged for automatic determining of the at least two parallel perspective lines and two orthogonal lines from computer processing of at least one of the single picture frame data and the displayed single frame picture image, and for allowing user acceptance of the at least two parallel perspective lines and two orthogonal lines.

4. An image processing apparatus implemented by a computer, comprising:

an image data apparatus for supplying single picture frame data corresponding to a single frame picture image;

a display displaying the single frame picture image corresponding to single picture frame data;

a camera parameter apparatus for determining from one of the single picture frame data and the displayed single frame picture image, camera parameters of a camera used to image the single picture frame data; and a 3-D model extracting apparatus using the camera parameters with respect to the single frame picture image, for extracting 3-D model data for at least one object from one of the single picture frame data and the displayed single frame picture image;

wherein the camera parameter apparatus comprises:

a designating apparatus for designating with respect to one of the single picture frame data and the displayed single frame picture image, at least two parallel perspective lines and two orthogonal lines; and a calculating apparatus for calculating, using the at least two parallel perspective lines and the two orthogonal lines, the camera parameters including a camera position, a camera line of sight direction and a focus length, wherein the designating apparatus is arranged for automatically determining of candidate lines for the at least two parallel perspective lines and two orthogonal lines from computer processing of at least one of the single picture frame data and the displayed single frame picture image, and for allowing user acceptance of ones of the candidate lines for the at least two parallel perspective lines and two orthogonal lines.

5. An apparatus as claimed in claim 1, wherein the 3-D model extracting apparatus comprises:

an extracting apparatus for extracting 3-D model data for at least one of point, line, plane and shape features of the at least one object from one of the single picture frame data and the displayed single frame picture image; and an overlay apparatus for calculating and overlaying, using the 3-D model data, an object model wire frame of the at least one object on the single frame picture image.

6. An apparatus as claimed in claim 5, wherein the extracting apparatus comprises a user input device including at least one of a computer mouse and computer keyboard, and the 3-D model data are interactively designated on the displayed single frame picture image by a user with the user input device.

7. An apparatus as claimed in claim 6, wherein the extracting apparatus further uses relating information input by a user with the user input device to extract the 3-D model data, such relating information defining a relationship between at least one of points, lines, planes and shapes of the at least one object.

8. An apparatus as claimed in claim 6, wherein the extracting apparatus further uses restricting information input by a user with the user input device to extract the 3-D model data, such restricting information restricting a location which can be interactively designated on the displayed single frame picture image by a user with the user input device.

9. An apparatus as claimed in claim 5, wherein the extracting apparatus is arranged for automatically determining of the 3-D model data from computer processing of the at least one of the single picture frame data and the displayed single frame picture image, and for allowing user acceptance of the 3-D model data.

10. An apparatus as claimed in claim 5, wherein the extracting apparatus is arranged for automatically determining of candidate lines for the 3-D model data from computer processing of the at least one of the single picture frame data and the displayed single frame picture image, and for allowing user acceptance of ones of the candidate lines for the 3-D model data.

11. An image processing method implemented by a computer, comprising the steps of:

supplying single picture frame data corresponding to a single frame picture image;

displaying the single frame picture image corresponding to single picture frame data;

determining from one of the single picture frame data and the displayed single frame picture image, camera parameters of a camera used to image the single picture frame data; and extracting, using the camera parameters with respect to the single frame picture image, 3-D model data for at least one object from one of the single picture frame data and the displayed single frame picture image;

wherein the determining step comprises the sub-steps of:
designating with respect to one of the single picture frame data and the displayed single frame picture image, at least two parallel perspective lines and two orthogonal lines; and calculating, using the at least two parallel perspective lines and the two orthogonal lines, the camera parameters including a camera position, a camera line of sight direction and a focus length.

12. A method as claimed in claim 11, wherein the designating step includes use of a user input device including at least one of a computer mouse and computer keyboard, and the at least two parallel perspective lines and two orthogonal lines are interactively designated on the displayed single frame picture image by a user with the user input device.

13. A method as claimed in claim 11, wherein the designating step includes the sub-steps of automatic determining the at least two parallel perspective lines and two orthogonal lines from computer processing of at least one of the single picture frame data and the displayed single frame picture image, and allowing user acceptance of the at least two parallel perspective lines and two orthogonal lines.

14. A method as claimed in claim 11, wherein the designating apparatus includes the sub-steps of automatically determining of candidate lines for the at least two parallel perspective lines and two orthogonal lines from computer processing of at least one of the single picture frame data and the displayed single frame picture image, and allowing user acceptance of ones of the candidate lines for the at least two parallel perspective lines and two orthogonal lines.

15. A method as claimed in claim 11, wherein the extracting step comprises the sub-steps of:
sub-extracting 3-D model data for at least one of point, line, plane and shape features of the at least one object from one of the single picture frame data and the displayed single frame picture image; and calculating and overlaying, using the 3-D model data, an object model wire frame of the at least one object on the single frame picture image.

16. A method as claimed in claim 15, wherein extracting step includes use of a user input device including at least one of a computer mouse and computer keyboard, and the 3-D model data are interactively designated on the displayed single frame picture image by a user with the user input device.

17. A method as claimed in claim 16, wherein the extracting step includes use of relating information input by a user with the user input device to extract the 3-D model data, such relating information defining a relationship between at least one of points, lines, planes and shapes of the at least one object.

18. A method as claimed in claim 16, wherein the extracting step further uses restricting information input by a user with the user input device to extract the 3-D model data, such restricting information restricting a location which can be interactively designated on the displayed single frame picture image by a user with the user input device.

19. A method as claimed in claim 15, wherein the extracting step performs the sub-steps of automatically determining the 3-D model data from computer processing of the at least one of the single picture frame data and the displayed single frame picture image, and allowing user acceptance of the 3-D model data.

20. A method as claimed in claim 15, wherein the extracting step performs the sub-steps of automatically determining candidate lines for the 3-D model data from computer processing of the at least one of the single picture frame data and the displayed single frame picture image, and allowing user acceptance of ones of the candidate lines for the 3-D model data.

* * * * *